United States Patent [19]
Huyler

[11] 3,892,199
[45] July 1, 1975

[54] AQUARIUM

[75] Inventor: Jerome F. Huyler, Winnetka, Ill.

[73] Assignee: Aquatium, Inc., Winnetka, Ill.

[22] Filed: June 29, 1973

[21] Appl. No.: 374,911

Related U.S. Application Data

[63] Continuation-in-part of Ser. No. 258,706, June 1, 1972, abandoned.

[52] U.S. Cl. .................................................. 119/5
[51] Int. Cl. .......................................... A01k 63/00
[58] Field of Search ........................... 119/5; 210/169

[56] References Cited
UNITED STATES PATENTS

| | | | |
|---|---|---|---|
| 2,858,799 | 11/1958 | Krauss et al. | 119/5 |
| 2,935,199 | 5/1960 | Willinger | 210/169 |
| 3,468,288 | 9/1969 | Cassil | 119/5 |
| 3,487,440 | 12/1969 | Newsteder | 119/5 X |
| 3,516,544 | 6/1970 | Sesholtz | 119/5 X |
| 3,566,840 | 3/1971 | Willinger | 119/5 |
| 3,638,795 | 2/1972 | Feddern et al. | 210/169 |
| 3,738,494 | 6/1973 | Willinger et al. | 210/169 |

FOREIGN PATENTS OR APPLICATIONS

| | | | |
|---|---|---|---|
| 1,302,572 | 7/1962 | France | 119/5 |

*Primary Examiner*—Hugh R. Chamblee
*Attorney, Agent, or Firm*—McGarry & Waters

[57] ABSTRACT

An aquarium includes an open topped fish tank and an enclosed module mounted on top of the fish tank, wherein the water in the tank is circulated rapidly through the module and is automatically filtered, heated, and aerated as it passes through the module. The module includes a pump for pumping the water and a removable water compartment that houses a filter and a water heater, both of which are removable from the water compartment. The module also includes an automatic fish feeder and an artificial light for providing illumination and stimulating plant growth. In operation, unclarified water is withdrawn from the tank by the pump through an undergravel filter mounted at the bottom of the fish tank. This water is first filtered and then heated in the water compartment and then spills over a raised, elongated partition in the water compartment and passes downwardly into the tank in the waterfall fashion through an elongated outlet opening in the bottom of the water compartment. This waterfall action disperses the water and provides natural aeration of the water. The rapid circulation of water through the system enhances natural aeration and stimulates the development of a natural biological environment in the filter medium that consumes fish waste.

21 Claims, 31 Drawing Figures

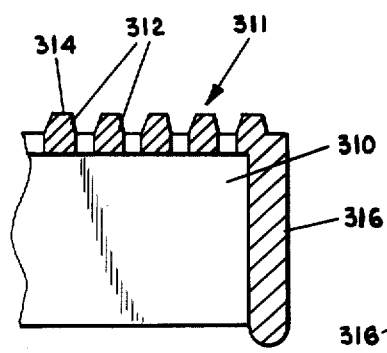
FIG. 27
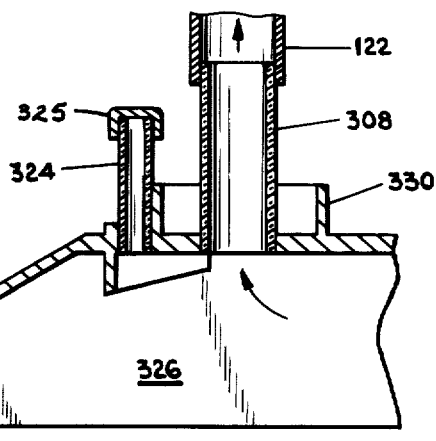
FIG. 28
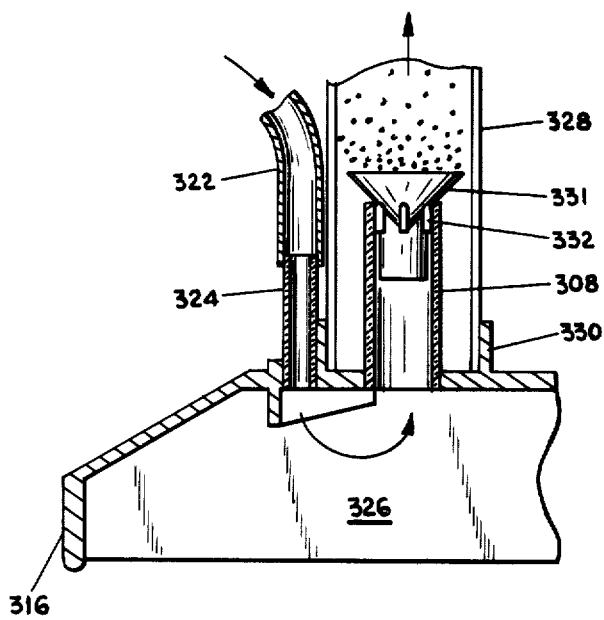
FIG. 29
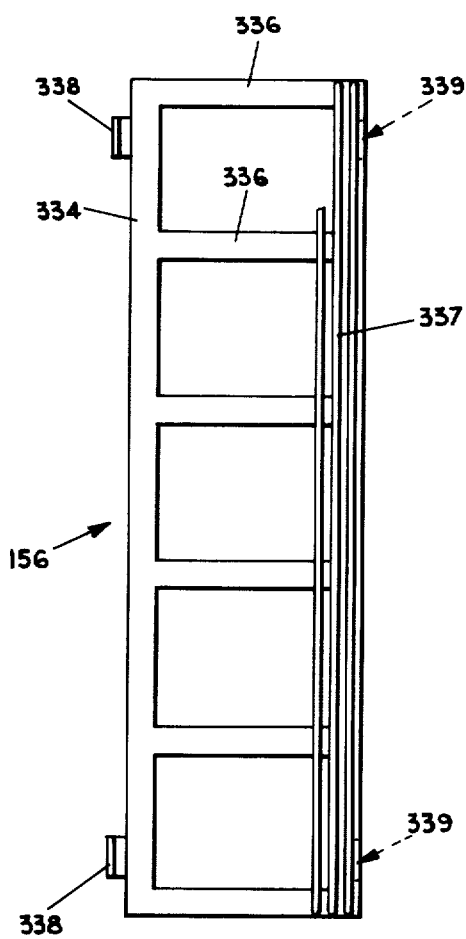
FIG. 30
FIG. 31

AQUARIUM

CROSS REFERENCE TO RELATED APPLICATION

This application is a continuation-in-part of applicants' co-pending U.S. Pat. application Ser. No. 258,706, filed June 1, 1972, now abandoned.

BACKGROUND OF THE INVENTION

1. Field of the Invention

This invention relates generally to aquariums and more particularly to an aquarium wherein a pump, filter, water heater, aerator, feeder, and light are all incorporated in an enclosed module at the top of an open fish tank and wherein water may be recirculated through the apparatus at the rate of at least 180 gallons per hour.

2. Description of the Prior Art

In recent years, the care and maintenance of fresh and salt water fish in aquariums has become one of the most popular hobbies in the United States. Since an aquarium is an artifical environment for fish and contains only a limited volume of water, it is necessary to carefully regulate the environment within the aquarium in order to sustain fish life therein.

One type of control necessary in an aquarium is the periodic filtration of the water in order to remove fish excrement and other impurities that accumulate in the water. Filtration systems are well known and sometimes are incorporated along with a pump in a unit which is mounted on the side wall of the aquarium. The pump withdraws water from the aquarium and pumps it through a filter medium such as granulated charcoal or the like and then returns the water back to the aquarium in a filtered state.

Sometimes undergravel filters are employed in lieu of or in combination with a granulated charcoal filter. An undergravel filter is a perforated grating that is placed on the bottom of the aquarium and covered with gravel. Water is withdrawn from underneath the grating so as to cause the water to flow downwardly in the tank through the gravel. This action enhances the settling of solid particulate matter in the tank and causes the filtration of such solid matter from the water in the gravel resting on the grating.

One of the most recurrent problems with filters is that they must be cleaned frequently, and cleaning filters or replacement of filter medium is a time-consuming, expensive, and bothersome chore. In addition, the fish environment is disturbed during cleaning, and this endangers the health of the fish.

Another necessary step in the operation of an artifical aquarium in order to maintain the proper fish environment in the tank is the aeration of the water in the tank. Fish continuously withdraw oxygen from the water in the tank, and this oxygen must be replaced or the fish will suffocate. In simple aquariums, the water is replaced frequently with fresh tap water or fresh salt water, but this is expensive and time-consuming and upsets the environment of the fish. Consequently, in all but the more elementary aquariums aeration is provided by a separate electrically operated air pump that bubbles air into the water in the aquarium by any of several different methods.

In one method the air is bubbled directly into the water at the bottom of the tank through an outlet fixture that disperses the air into fine bubbles. Another method for bubbling air into the water in an aquarium is employed in combination with an undergravel filter, in the manner shown in Sesholtz U.S. Pat. No. 3,516,544. In this type of apparatus, air is pumped downwardly into a cavity beneath the undergravel filter and is permitted to bubble back up into the tank through a hollow tube mounted over another opening above the cavity. The action of the air passing up through this tube causes a partial vacuum in the cavity beneath the tube, and this causes the water under the undergravel filter to flow upwardly through this tube back into the aquarium, thus drawing more water downwardly through the undergravel filter.

One problem associated with prior aeration systems is that such systems invariably require separate air pumps and conduits for introducing the air into the aquarium in order to accomplish their desired function. This is, of course, expensive. Another disadvantage with such systems is that they introduce air into the tank in an unnatural and artificial manner and often cause smoke and other undesirable pollutants in the ambient air to become mixed with the water. Also, pollutants picked up from the air pump are entrained in the air and introduced into the water.

Another necessary element of environment control in an aquarium is the provision of a means for heating the water in order to maintain any desired water temperature within the aquarium. Water heaters are well known and thermostatic control units associated with such water heaters or incorporated in such water heaters are also well known. However, in a typical installation, the water heater is inserted downwardly directly into the fish tank along one side of the water tank. This type of heater produces a hot spot in the area adjacent the heater, and since circulation of the heated water is accomplished primarily by convection, a substantial temperature gradient is produced in the tank.

Another element commonly employed in an aquarium is an artificial light, typically a fluorescent light, suspended above the aquarium in order to provide illumination and to stimulate plant growth. Sometimes such lights are enclosed in a hooded housing mounted over the top of the aquarium.

Another element employed in some aquariums is an automatic fish feeder, which automatically dispenses a predetermined amount of food into the tank each day over a period of time of up to about 14 days. Such devices are well known and are sometimes incorporated in housings mounted on top of the fish tank.

One disadvantage with all of the above described systems is that the filter, heater, aerator and light are generally available only as separate components, and each attach on to the fish tank in their own particular manner, usually by a mounting bracket fastened to the upper edge of the fish tank, with the light and perhaps the feeder being mounted in a hood on top of the tank. Such components are not only inadequate in providing a natural fish environment, but they are unaesthetic and obstruct the view through the transparent wall of the fish tank. Accordingly, this type of apparatus is usually placed against the wall, so that the unsightly equipment can be placed out of view behind the aquarium. This, of course, impairs access to the equipment for repair and removal and limits the viewability of the aquarium to a single side of the tank.

Recently, attempts have been made to incorporate one or more of the foregoing elements in a single module, which is placed either in an enclosed housing on top of the tank or in a single unit suspended from the side of the tank in the same manner as previous units have been suspended. However, none of these units have provided a means for the complete control of the environment within the fish tank, and none of these apparatus have provided an alternative to the artificial aeration of the water by means of a separate air pump designed to bubble air into the water. Further, prior apparatus in which filter, heater, and pump have been incorporated into a single module on top of the tank are unsatisfactory in that the apparatus is complex and expensive and the various elements incorporated in the module are difficult to remove for replacement or cleaning.

An important additional disadvantage with previous filtering systems is that such systems fail to circulate the water through the filtering system at a sufficient rate of speed to provide a suitable environment in the filter medium for the development of diatomic biological life that consumes fish waste. If water is circulated through a filter such as an undergravel filter at a sufficiently high rate of speed, solid waste and fish excrement entrained in the water are broken down as the water rushes through the filter medium. With the solid waste existing in a broken down state in the filter medium, natural diatoms (i.e., single celled algae) rapidly develop in the filter medium and consume this waste material, thus biologically removing the waste material from the water. The biological consumption of water matter improves the efficiency of the filter system and markedly prolongs the length of time the filter may be employed between cleanings.

The concept of biological filtration is known, but heretofore most filter systems have not employed or been able to employ water recirculation rates sufficient to sustain diatomic life in the filter medium. In most filter apparatus designed for a standard 20 gallon tank, the water is recirculated at rates well under 150 gallons per hour, with the recirculation rates of apparatus combining several elements in an enclosed module on top of the fish tank being substantially lower. These rates are insufficient to sustain a vigorous diatomic environment in the filter medium.

The present invention overcomes the deficiencies of the above discussed prior aquarium systems and provides an enclosed module incorporating a unitized filtering, heating, aerating, feeding, and light system capable at circulating water at rates of speed sufficient to sustain a diatomic environment in the filter medium.

SUMMARY OF THE INVENTION

In accordance with the present invention, an improved aquarium comprises an open-topped water containing tank and an enclosed module mounted on the tank for automatically filtering, heating, and naturally aerating the water wherein, the water is recirculated through the module at a sufficient rate of speed to rapidly develop and maintain a suitable biological environment in the filter medium. For this purpose, the water in the tank should be recirculated through the filter system at least about seven and one-half times per hour and preferably at least nine times per hour. For a normal 20 gallon tank, the actual flow rate should be at least about 150 gallons per hour and preferably at least 180–210 gallons per hour. A biological environment probably would develop at recirculation rates as low as 5 times per hour (100 gallons per hour for a 20 gallon tank and 150 gallons per hour for a 30 gallon tank), but it would take a substantially longer period of time for this to occur at this rate of speed.

The module of the present invention comprises a pump that continuously circulates water through the module at a rate of at least 180 gallons per hour; a filter that receives water from the pump and clarifies the water at a rate of at least 180 gallons per hour without requiring pressure filtration; a water heater that receives clarified water from the filter and heats the water satisfactorily at circulation rates of at least 180 gallons per hour; and a natural aeration mechanism comprising an elongated opening in the bottom of the module adjacent the heater and a raised elongated partition running along the edge of the outlet and separating the outlet from the heater. After water is heated, it spills over the partition and falls downwardly in to the tank in waterfall fashion. This waterfall action finely disperses the water as it falls through the air, thereby providing natural aeration of the water. This mechanism provides sufficient natural aeration of the water to maintain adequate oxygen levels in the water. For most effective operation, the partition and outlet opening should be at least about 3 inches long.

Preferably, the module also includes an automatic fish feeder and a light for providing illumination and stimulating plant growth.

One of the important advantages of the present invention is that the water is thoroughly filtered, heated, and aerated at a recirculation rate sufficient to develop and maintain a natural biological environment of diatoms in the filter medium. This apparatus is particularly advantageous when it is used in connection with an undergravel filter system, so that the biological environment can be developed in the gravel of the undergravel system.

Preferably, the undergravel filter of the present invention is sloped upwardly toward the outlet thereof in order to enhance water flow characteristics. Also, the undergravel filter comprises a ribbed grating that rests on and extends upwardly from an underlying support structure. This type of construction provides water circulation through all areas of the gravel and eliminates "dead" spots, or areas where there is no water circulation. Dead spots breed toxic conditions that adversely affect the biological environment in the filter medium.

In order to provide adequate filtration at a rate of 180 gallons per hour, the filter has a large area of filtration and comprises a removable filter tray having a perforated bottom and vertically slotted sides, with a filter medium such as granulated charcoal or the like covering the openings in the bottom and sides of the container. The bottom of the filter tray is raised above the bottom of the filter compartment, so that water can pass out of the filter both through the bottom and the sides of the filter tray.

Another important feature of the present invention is that both the filter tray and water heater are mounted in a single removable water compartment and both are removable from the water compartment. This facilitates cleaning and repair.

A simple, electrical circuit having three operating buttons controls the operation of the light and feeder, and the pumping and heating apparatus. The pump and the heater are connected in the same circuit, so that if the pump for some reason shuts off, the heater also will shut off so as to prevent over-heating of the heating element.

These and other advantages will hereinafter appear, and for purposes of illustration, but not of limitation, a preferred embodiment of the subject invention is described in detail below.

BRIEF DESCRIPTION OF THE DRAWINGS

FIG. 27 is a sectional view taken along lines 27—27 of FIG. 26.

FIG. 28 is a sectional view taken along line 28—28 of FIG. 26.

FIG. 29 is the same view shown in FIG. 28, showing the use of the undergravel filter in an air pressure recirculation system.

FIG. 30 is an end view of an extension bracket for the undergravel filter of the present invention.

FIG. 31 is a top view of an extension bracket for the undergravel filter of the present invention.

DETAILED DESCRIPTION OF PREFERRED EMBODIMENTS

Figure 1:
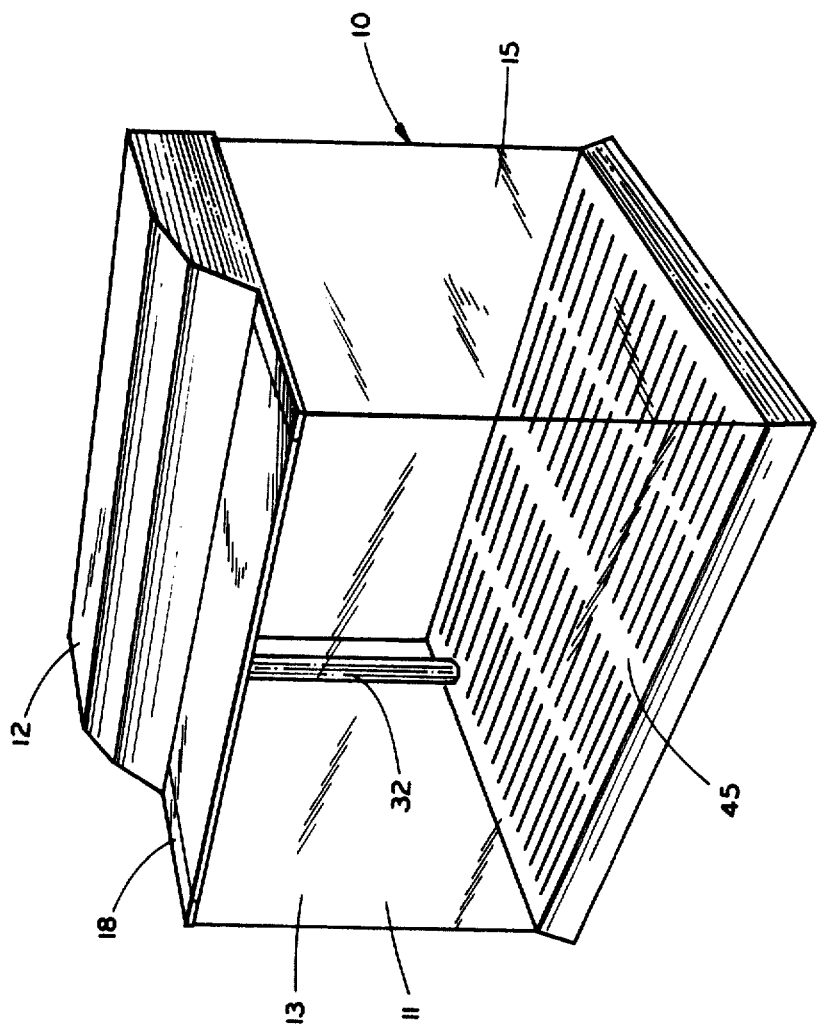
FIG. 1 is a perspective view of a first embodiment of an aquarium formed in accordance with the present invention.

The present invention will now be described in connection with two preferred embodiments. The first embodiment is shown in FIGS. 1–8, and the second embodiment is shown in FIGS. 9–31.

EMBODIMENT I

Referring to the illustrative embodiment shown in the FIGS. 1–8 of the drawing, numeral 10 designates generally an aquarium, which includes a water tank 11 and a pumping, filtering, and heating module 12. The particular tank illustrated is formed of glass or plastic and has a generally rectangular horizontal configuration provided by front and rear walls 13 and 14 and side walls 15 and 16 which extend generally vertically upwardly from a solid bottom or base 17.

The module 12 is provided by a housing or frame preferably formed of molded plastic and having a generally rectangular base 18 which rests on the top edges of the tank walls and covers the tank. A rear wall 19 extends vertically upwardly from the back edge of the base and extends for the full length of the base. A vertically extending front wall 20 is spaced forwardly of the rear wall, and a raisable top 21 extends between the front and rear walls.

A plurality of vertical walls or partitions which extend between the front and rear walls of the module divide the interior of the module into a series of compartments. A pair of end transverse walls 22 and 23 close the ends of the module, and a pair of intermediate walls 24 and 25 are positioned between the end walls. The wall 24 extends transversely between the front and rear walls and extends from the bottom wall 18 to the top 21 to form a pump chamber or compartment 26. The wall 25 extends angularly from the rear wall at 25a, parallel to the front and rear walls at 25b, and transversely to the front wall at 25c. The wall 25 is seen to terminate below the top 21 and provides a water compartment 27 between the wall 24 and the wall 25. The top of the middle portion 25b of the wall 25 is recessed at 28 (FIGS. 2 and 8) to provide an elongated raised partition, and a channel-shaped wall 29 is positioned behind this partition to provide an outlet channel or compartment. An elongated opening 30 is provided in the bottom wall between the walls 25b and 29 to permit water spilling over the top of the partition 25b to fall freely into the tank in waterfall fashion.

A high power fractional horsepower pump motor 31 such as is available from March Manufacturing Co. of Glenview, Ill. is positioned within the compartment 26 and withdraws water from the bottom of the tank through water pipe 32. The bottom impeller portion 31a of the pump is located below the water level of the tank so that pump is kept in constant prime even when the pump stops. The water withdrawn from the tank through pipe 32 is pumped through pipe 33 which extends through an opening in wall 24 and into a cylindrical filter container 34 which is positioned within the water compartment 27. The filter container is filled with a suitable filter medium 35 such as charcoal and/or gravel and spun plastic wool. The filter container could also have a rectangular or other shaped configuration.

Figure 5:
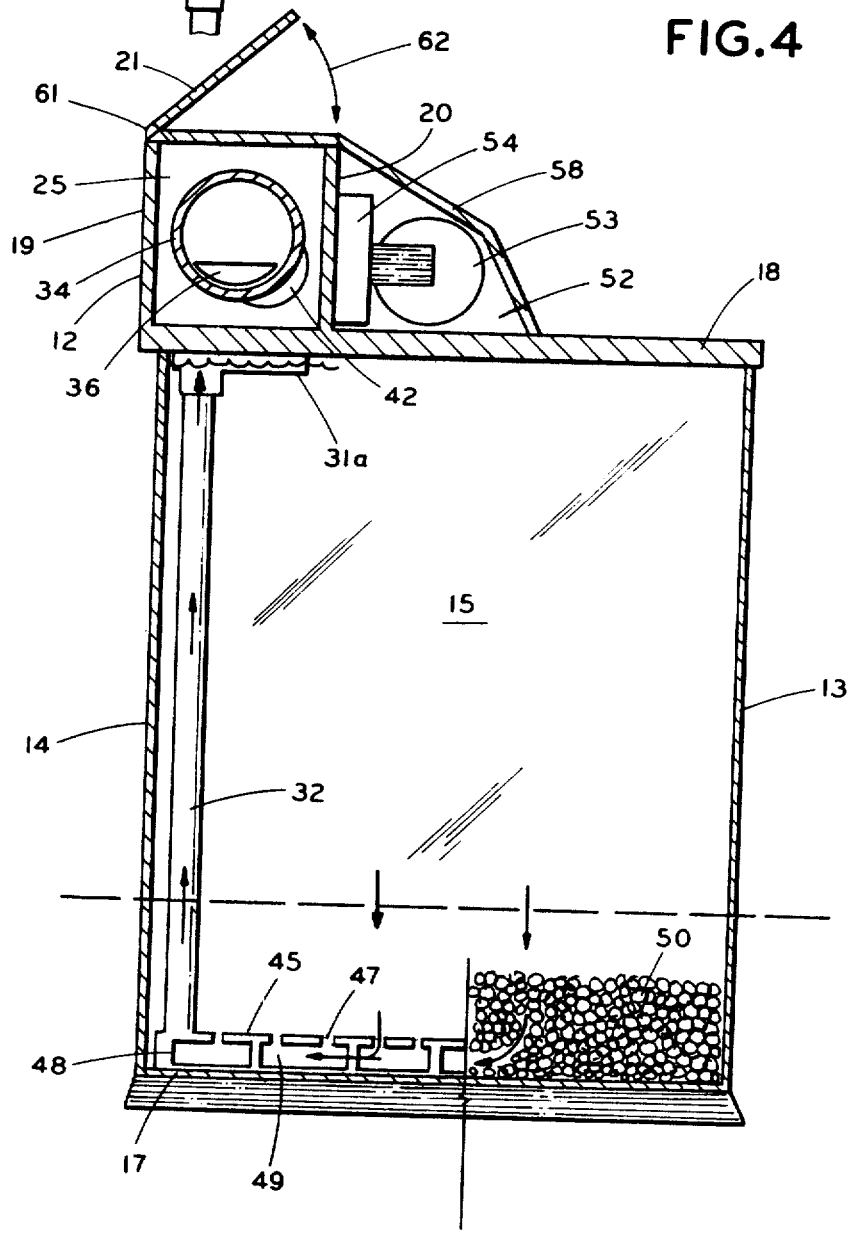
FIG. 5 is a sectional view taken along line 5—5 of FIG. 2.
Figure 6:
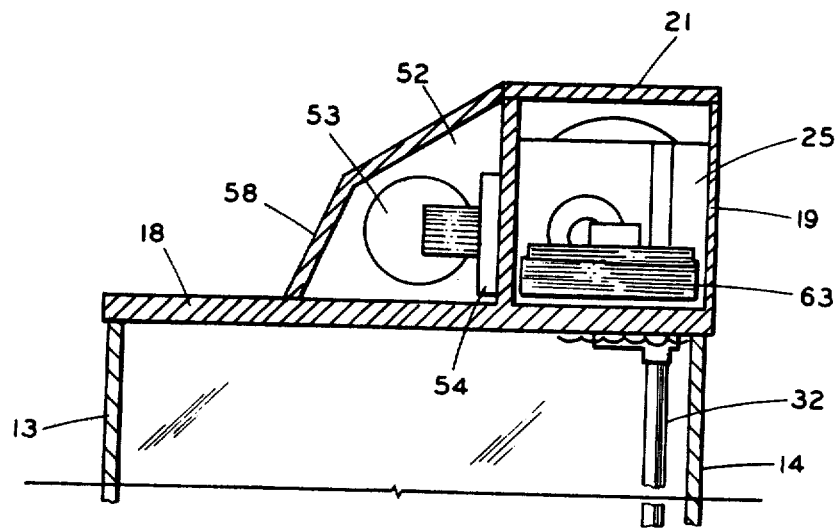
FIG. 6 is a sectional view taken along line 6—6 of FIG. 2.
Figure 7:
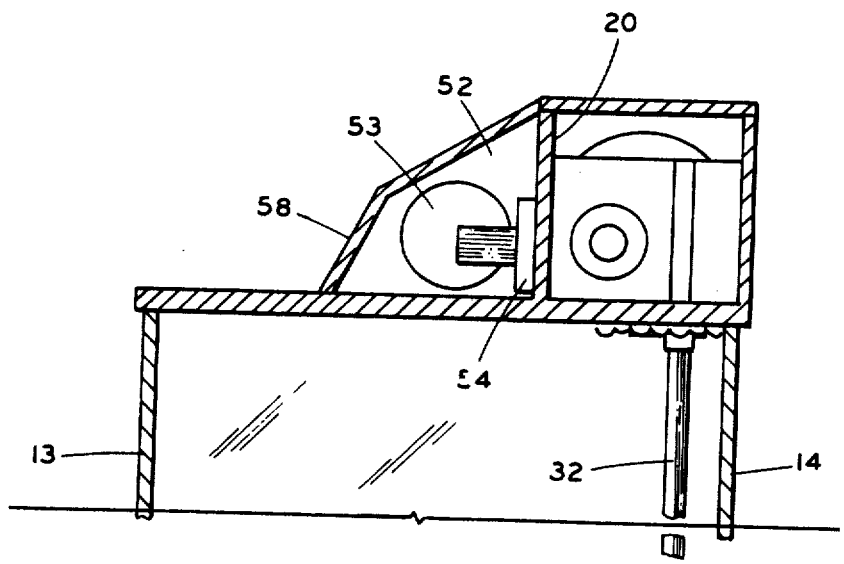
FIG. 7 is a sectional view taken along line 7—7 of FIG. 2.
Figure 8:
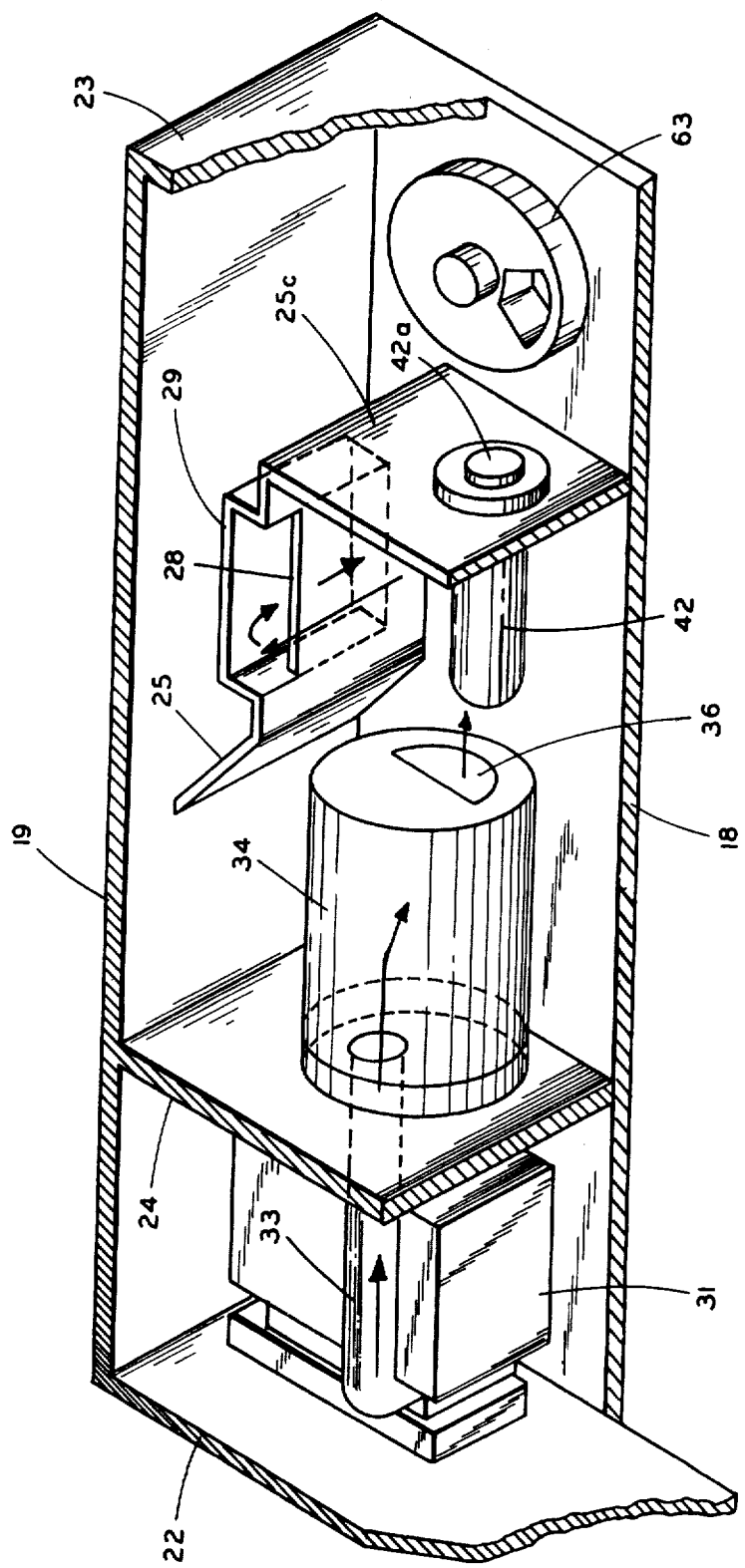
FIG. 8 is a broken perspective view of the first embodiment of the module of the present invention.

The water inlet pipe 33 for the filter is removably secured to the top of the container adjacent the left side thereof so that water flows downwardly and to the right toward a moon-shaped exit opening or slot 36 (See FIG. 5 in which the filter container is shown empty) provided in the right end wall of the container. The flow of water through the filter is indicated by the arrows, and the water flows under the influence of both gravity and the force exerted by the pump. The container can be withdrawn from the water compartment for replacement as desired merely by disconnecting the inlet pipe 33 and lifting the container. The filter container may be conveniently provided in disposable form so that a container may be discarded when excessive filtered material accumulates and replaced with a new filter. Alternatively, the filter media within the container can be provided in package form or the like so that it can be conveniently removed from the container and replaced with fresh filter packages. As can be seen in FIG. 5, the opening 36 is located adjacent the bottom wall 18 so that water exits from the filter near the bottom of the water compartment. Also, the opening is spaced slightly from the bottom of the filter container so that when the filter container is withdrawn from the water compartment, water remaining in the container will be retained therein and will not drip.

A conventional electric water heater 42, which is encased within a glass tube, extends into the water compartment through the transverse portion 25c of wall 25. As water flows through the opening 36 in the filter container, it is heated by the already heated water within the water compartment and by the heaters, and a general upward and rightward current is created within the water compartment by the pressure provided by the pump and by the weight differential between the water in the hot and cool portions of the water compartment.

As water is pumped through the filter and into the water compartment, heated water continuously flows over the partition 25b and falls freely in waterfall fashion through the outlet channel provided by the wall 29, through the opening 30, and into the tank. As the water falls, the waterfall action thoroughly disperses the water into fine droplets and provides natural aeration to the water as it falls downwardly into the tank. In one specific embodiment the distance between the top of the overflow partition 25 and the surface of the water in the tank was about two inches, and this amount of free fall provided good aeration without excessive turbulence. Moreover, any turbulence caused by the waterfall is not substantially different than turbulence which might be encountered by the fish in their natural environment.

The warmed water becomes distributed in the tank, and as it cools provides natural thermal layers or a thermal gradient between the surface of the water and the bottom of the tank. The water is also drawn downwardly by the suction created at the bottom of the tank by the pump 31.

An undergravel filter or grate 45 extends substantially coextensively with the bottom 17 of the tank and includes a generally planar central portion 46 (FIG. 3) which is provided with perforations or slots 47 through substantially all of its area. The grate also includes a depending or downwardly extending inperforate perimetric wall 48 which supports the perforated portion slightly above the bottom of the tank to provide a water chamber 49 below the perforated portion. The water pipe 32 is connected to the grate at the left rear corner thereof and communicates with the water chamber 49. A filter medium 50 (shown partially in FIG. 5) such as calcite chip gravel is supported by the preforated planar portion of the grate and extends over the entire surface thereof and between the perimetric wall 48 and the walls of the tank. The gravel bed 50 is shown partially in the right hand portion of FIG. 5 and is omitted in FIGS. 1–3 for clarity. The suction provided by the pump acting through the pipe 32 draws water through the gravel bed and provides an initial screening or filtering of material in the water. Since the pipe 32 is connected to the grate 45 at a location which is well removed from the area where the water falls into the tank, the possibility of cold spots developing in the tank is reduced. The gravel bed provides some resistance to the withdrawal of water therethrough, and water is therefore withdrawn substantially uniformly through the entire area of the bed even though the bed area is much greater than the area of the pipe 32.

Since the water is initially screened by the gravel bed, the likelihood that the pipes 32 and 33 or the pump 31 will become clogged is reduced, and the useful life of the filter within the container 34 is increased. When the gravel bed accumulates excessive material, the gravel can easily be removed from the tank by lifting the pipe 32 and the grate, and the gravel can be cleaned by washing in clean water.

The end walls 22 and 23 of the module extend forwardly of the front wall 20 to provide a light compartment 52, and a light 53 is supported within the light compartment by a hollow base 54 which is secured to the front wall 20. The light is advantageously of the type which provides simulated sunlight such as a light sold under the trademark "Vita-lite," which reproduces 0.91 natural sunlight. The front wall 20 of the module, or at least the portion of the front wall which extends along the water compartment, may advantageously be formed of clear plastic or other translucent or transparent material to permit light from the light source 53 to enter the water compartment. The light not only provides illumination of the tank but stimulates biological growth of algae and other plant life. Algae acts as a natural biological filtering medium, and light directed into the water compartment will promote algae growth. If desired, shade or visor means may be provided for the light for permitting the amount of light emitted or the direction of the light rays to be varied. By varying the amount of light directed into the water compartment or into the tank, the growth of algae can be controlled as desired.

The light compartment 52 can be closed by a cover 58 which can be hingedly secured to the front wall 20 as at 59 (FIG. 4) for movement as indicated by the arrows 60 to permit access to the light compartment. Similarly, access to the compartments formed by the walls 24 and 25 can be provided by hingedly connecting the top wall 21 to the rear wall 19 as at 61 (FIG. 5) to permit the movement indicated by the arrows 62.

An automatic feeder 63 can be mounted in the compartment 64 formed by the walls 23 and 25. The particular feeder illustrated is a Double "A" Brand fish feeder available from Appleton Electronics of Chicago, Ill. The feeder includes a rotating feeding element which drops an appropriate amount of food through an opening formed in the bottom wall of the module.

The pump 31, electric heater 42, and feeder 63 include wiring (not shown) which can extend through one of the module walls for connection to a conventional wall outlet. The wiring for the heater is connected at the heater base 42a which is positioned outside of the water compartment. Although only a single heater is shown, two or more heaters could be used for larger tanks.

We have found it advantageous to connect the pump and the heater to the same switch so that if, for some reason, power to the pump is shut off, the heater will also turn off. The problem of evaporating the water within the water compartment by continued operation of the heater is thereby avoided.

The module need not be secured to the tank and is supported merely by resting on the top edges of the tank walls. The module can therefore be readily removed for replacing the water, cleaning the gravel, or adding or removing fish.

Although the outlet partition 25b is illustrated as having a straight top edge spaced below the top of the module, it will be understood that the waterfall effect could conceivably be obtained by providing a plurality of spaced openings in a partition extending all the way to the top of the module, and the openings would be the effective top of the partition for maintaining the level of the water. It is important to the natural aeration of the water that the water be thoroughly dispersed as it falls through the air downwardly into the tank, because thorough dispersion markedly increases the surface area of the water exposed to the air and thus increases the rate of air absorption in the water. Further, in some cases it may be advantageous to position an inclined deflector below the location at which water overflows the water compartment and above the water level of the tank in order to decrease the turbulence caused by falling water. The water compartment may also be provided with a cover to minimize water loss due to evaporation.

EMBODIMENT II

Figure 9:
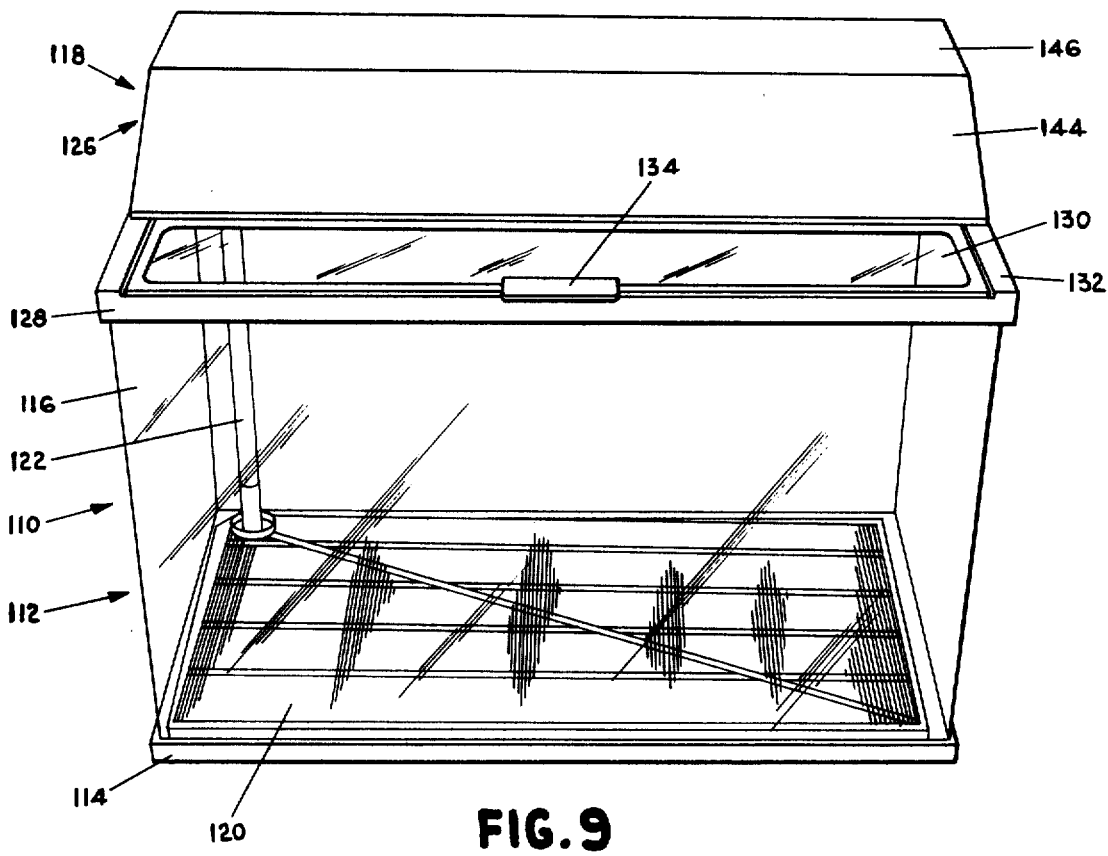
FIG. 9 is a front perspective view of a second embodiment of the aquarium of the present invention.

Referring now to FIGS. 9–31, a second embodiment 110 of the aquarium of the present invention is shown in assembled form in FIG. 9. Aquarium 110 comprises water tank 112 having a solid bottom 114 and transparent side walls 116. An enclosed control module 118 is mounted on the top of the aquarium, and an undergravel filter 120 is positioned on the bottom of the aquarium. Ordinarily, this undergravel filter would be covered with about one and one-half inches of gravel, but the gravel is omitted from the subject drawings in order to illustrate the configuration of the undergravel filter. The undergravel filter is connected to the control module at the top of the filter tank by means of a plastic tube 122.

Figure 11:
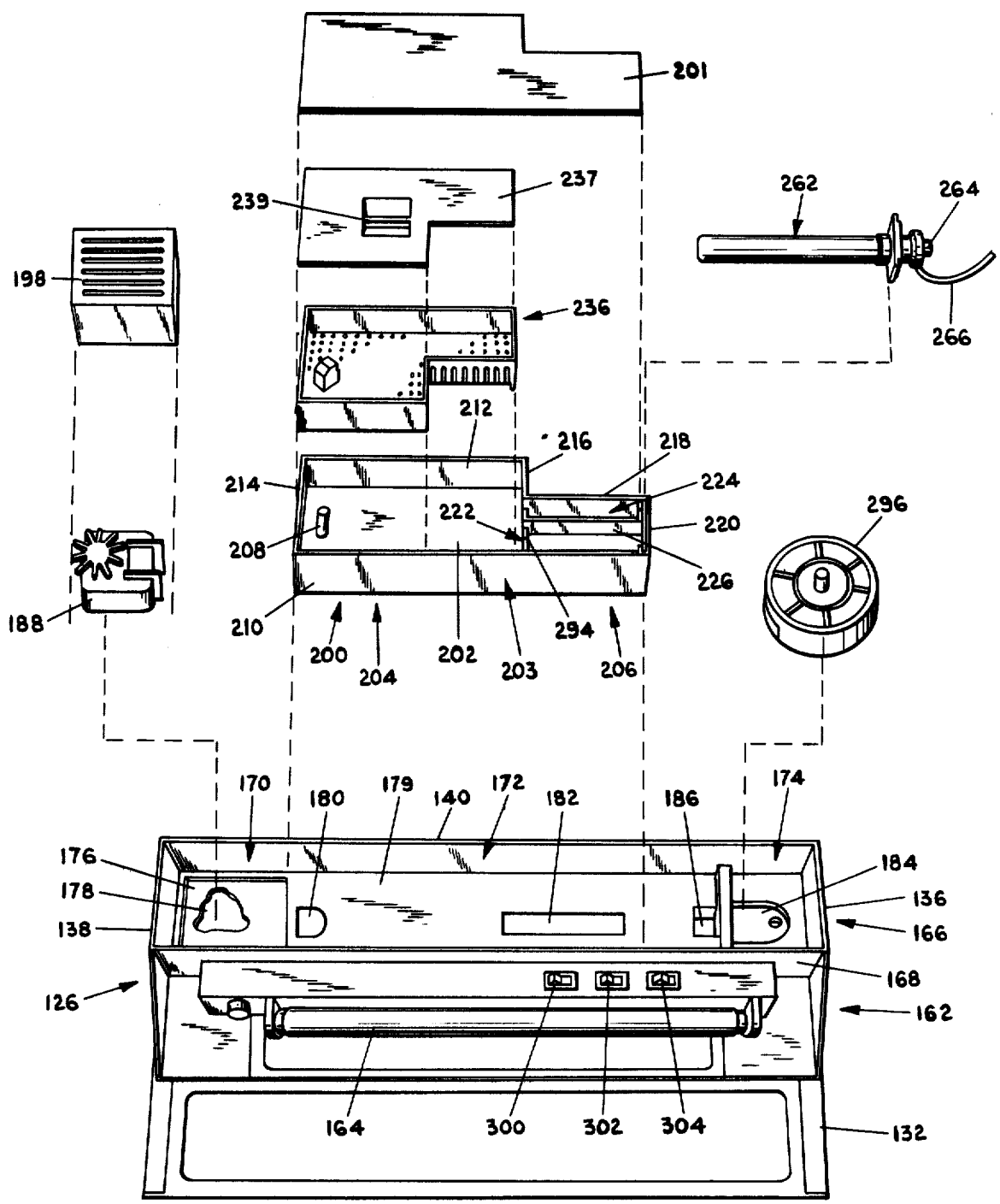
FIG. 11 is an exploded view of the internal components of the module of the second embodiment of the present invention.
Figure 13:
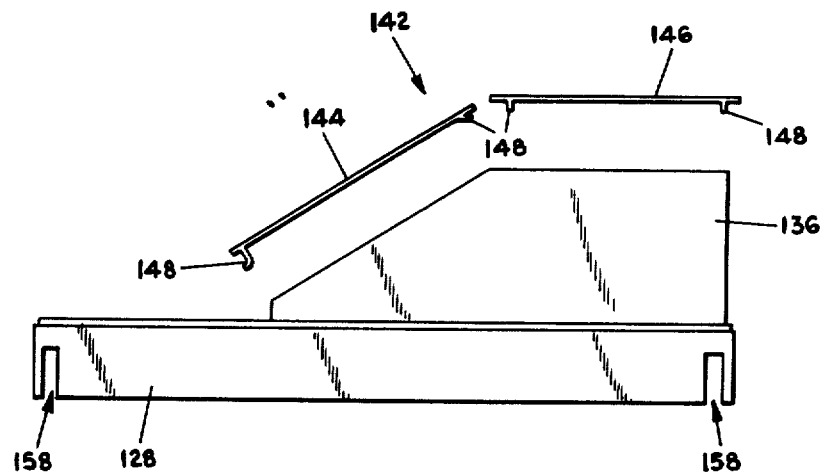
FIG. 13 is a side view of the module of the second embodiment of the present invention, showing the cover lifted from the module.
Figure 14:
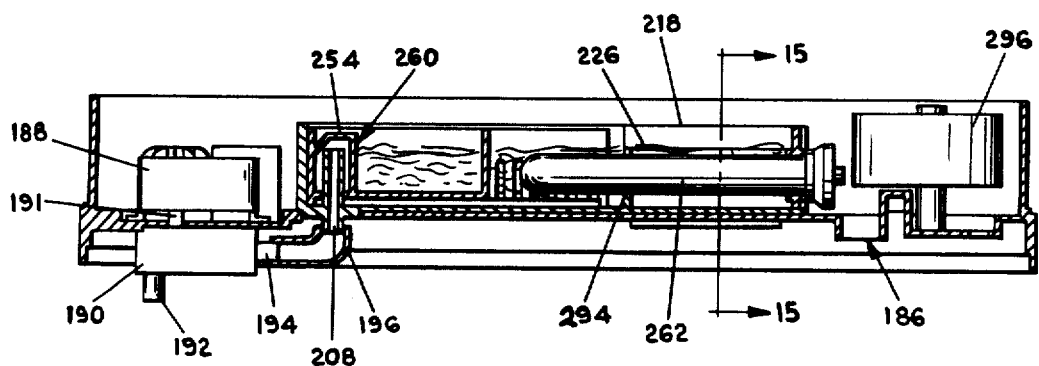
FIG. 14 is a sectional view taken along lines 14—14 of FIG. 2.

Control module 118 fits over the top of the aquarium and has downwardly extending flanges 128 that extend downwardly over the edges of the aquarium. A transparent glass or plastic top 130 rests on a frame 132 at the front of the module and comprises a handle 134 for raising the top. The rear portion of the module comprises an enclosed housing 126 having raised walls 136 and 138 at the ends or sides of the housing and a raised back wall 140 at the rear of the housing (FIG. 11 orientation). The housing is enclosed by a cover 142 which comprises an inclined front section 144 and a top section 146, as shown in FIG. 13. Front and top sections are held in place on the top of the housing by means of legs 148 that extend downwardly from the two sections and engage the interior edges of the side walls of the housing.

Figure 10:
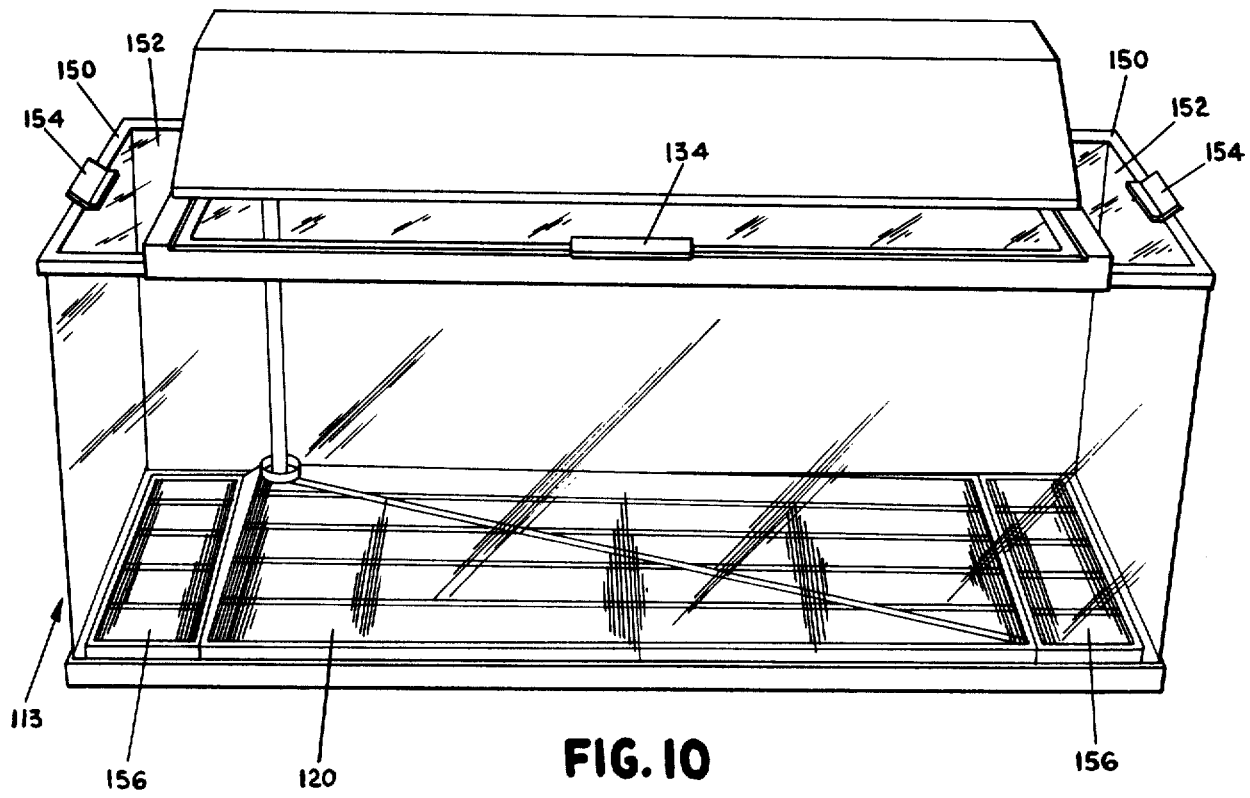
FIG. 10 is a front perspective view of the second embodiment of the aquarium of the present invention, showing the module mounted on a larger fish tank.

In the preferred practice of the present invention, control module 118 is constructed so that it will fit on a conventional 20 gallon water tank 112, and FIG. 9 depicts such an application. In FIG. 10, control module 118 is mounted on a 30 gallon water tank 113. In order to accomodate the larger tank, an extension flange 150 covers the open ends of the tank on the outside of the control module 118, and transparent tops 152 having handles 154 are insertable in these flanges. To provide complete coverage of the bottom of the tank by undergravel filter 120, perforated extension sections 156 are added on each end of the undergravel filter. The details of construction of these extension sections are described below and shown in FIGS. 30 and 31. As shown in FIG. 13, downwardly extending flanges 128 on the sides of the module (with the view of the aquarium shown in FIGS. 9 and 10 being of the front of the aquarium) are provided with upwardly extending slots 158 at the front and back portions thereof. These slots are designed to fit over the front and back edges of the tank shown in FIG. 10.

When a still larger water tank is employed (for example, a 40 gallon tank) two control modules may be placed side by side on the top of the tank and two undergravel filters may be employed on the bottom of the tank.

The overall internal construction of housing 126 is shown in the exploded view in FIG. 11. Housing 126 comprises a tapered front portion 162 housing a fluorescent fish light 164; and a rear portion 166, which houses the pumping, filtering, heating, aeration, and feeding apparatus of the present invention. Rear portion 166 is separated from front portion 162 by means of a front wall 168 that extends between end walls 136 and 138. Preferably, housing 126 is formed in a single piece of plastic in an injection molding process.

Rear portion 166 of housing 126 comprises a pump compartment 170 at the left hand end of the housing (FIG. 11 orientation); a filter and heater location 172 at the center of the compartment; and a feeder compartment 174 at the right hand end of the housing. Pump compartment 170 comprises a recessed pump mounting platform 176 and a pump opening 178. Filter and heater location 172 comprises a water inlet opening 180 at the left hand end thereof (FIG. 11 orientation) and an elongated rectangular water outlet opening 182 at the right hand end of the filter and heater location. Feeder compartment 174 comprises a recessed feeder mounting platform 184 and a fish food opening 186. All of the foregoing openings in the housing lead directly downwardly through the bottom 179 of the housing to the interior of the water tank.

A pump motor 188 is mounted in pump compartment 170 and comprises a vertical output shaft that extends downwardly through pump opening 178 into the interior tank. A pump impeller 190 (see FIG. 14) is mounted on the underside of the housing connected to the output shaft 191 of the pump motor. Impeller 190 comprises an inlet 192 and an outlet 194. Inlet 192 is connected to plastic tube 122 and leads to the undergravel filter 120. Outlet 194 of the pump is connected to a conduit 196 and leads to the water inlet in the filter and heater location in the housing.

The pump employed in this embodiment of the present invention may be the same as the pump employed in Embodiment I of the present invention. The principal requirements of this pump is that it be capable of pumping water from the undergravel filter to the filter in the module at a rate of at least 150 gallons per hour, preferably at a rate of 180 to 210 gallons per hour. Pump motor 188 is enclosed by means of a cover 198 that fits into the pump receptacle in the housing. Cover 198 may be slotted to improve the ventilation provided for the pump motor. Preferably, end wall 138, back wall 140, and/or top section 146 of the cover also are slotted in the area of pump motor 188 in order to further increase the ventilation of the pump motor.

The filter and heater elements of this embodiment of the present invention are mounted in a separate removable water compartment 200, which comprises a solid bottom 202 and upstanding side walls 203 that are interconnected to make the water compartment an open top water-containing vessel. It would be possible to make the water compartment an integral part of the housing, but is is preferable that the water compartment be a separately removable unit, in order to facilitate the cleaning thereof.

Water compartment 200 comprises a rectangular filter section 204 that extends the full distance between back wall 140 and front wall 168 and a relatively narrow heater section 206 that extends outwardly from one end of the filter section and only a portion of the distance between back wall 140 and front wall 168. The water compartment has an inlet 208 at the side of the filter section adjacent the pump compartment, with this inlet comprising a hollow tube that extends upwardly through the bottom of the water compartment into the interior thereof. This hollow tube also extends downwardly from the water compartment through water inlet opening 180 and into the housing. The lower end of this tube is connected to conduit 196 leading from the outlet of pump impeller 190.

Filter section 204 of the water compartment is defined by front and back walls 210 and 212, respectively, and left and right end walls 214 and 216 respectively, with front wall 210 also constituting the front wall of heater section 206. Heater section 206 is defined by three raised side walls, which include front wall 210, a back wall 218, and a closed outer end wall 220. Heater section 206 also includes an open end 222 that opens into the filter section of the water compartment.

Water compartment 200 has an elongated rectangular outlet opening 224 in the bottom thereof immediately adjacent back wall 218 in heater section 206. This outlet opening extends from end wall 220 to open end 222 and mates with water outlet opening 182 in housing 126 when the water compartment is in place in the housing.

A raised partition 226 extends along the inside edge of opening 224 parallel with back wall 218 from end wall 220 to open end 222 of heater section 206. The partition then follows a right angle path along the narrow edge of opening 224 and joins back wall 218 at the intersection of walls 218 and 216. Partition 226 extends upwardly into water compartment 200 and prevents water from flowing through outlet opening 224 until such time as the water reaches upper edge of the partition. The height of partition 226 is less than the height of the side walls in the water compartment, so that water passes through outlet 224 before it flows over the edge of the water compartment.

As shown in FIG. 11, the upper edge of partition 226 causes the water to flow over the edge of the partition and downwardly into the tank in waterfall fashion in a thin sheet. To provide adequate aeration and water dispersion, the upper edge of the partition should be at least 3 inches long, and the outlet should be large enough to accomodate a partition of this length. Preferably, this partition extends upwardly a distance sufficient to cause the water to fall a distance of about 4 inches from the top of the partition to the surface of the water in the tank. In falling this distance, the water becomes thoroughly dispersed into fine droplets and in this condition picks up sufficient oxygen from the ambient air in order to adequately aerate the water in the tank. The aeration is enhanced by the rapid circulation of the water through the module at flow rates exceeding 150 gallons per hour.

In addition to providing sufficient aeration to sustain aquatic life, this type of aeration provides an additional advantage over the artificial mechanical air pump aeration devices of prior developments in that the aeration of the water in the present apparatus is entirely natural and does not introduce any pollutants or contaminants into the water. Further, the aerated and heated water splashing gently down into the tank spreads rapidly out and down the entire surface of the water in the tank and settles to the bottom of the tank providing a natural thermal and aerated layer of water in the tank.

Figure 15:
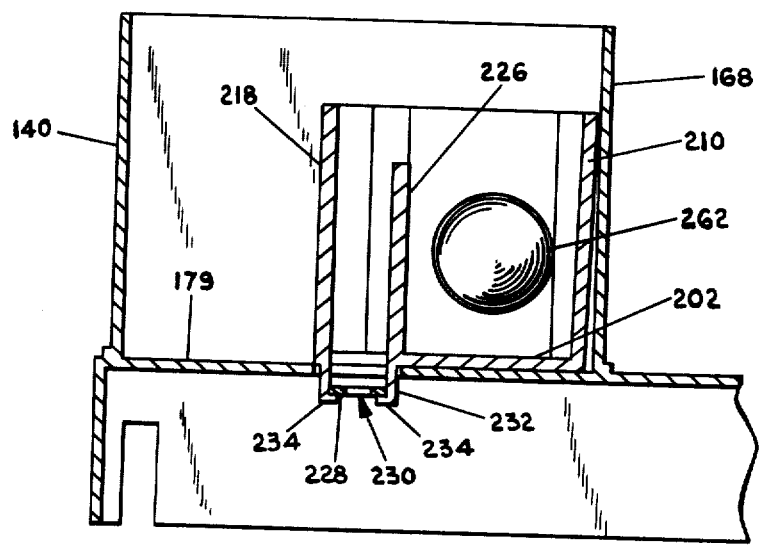
FIG. 15 is a sectional view taken along lines 15—15 of FIG. 14.
Figure 16:
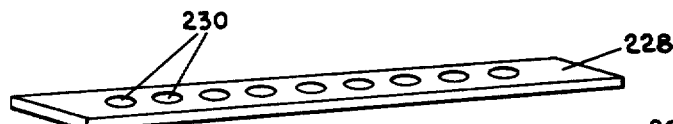
FIG. 16 is a perspective view of the preforated splash plate of the second embodiment of the present invention.

Although under most circumstances, the waterfall action present at the outlet of the water compartment produces no more than natural surface disturbance in the water than would be present in a fish's natural environment, if it is desired to reduce the turbulence caused by the water, a perforated splash plate 228 having a series of vertical openings 230 therein may be positioned between the upper edge of partition 226 and the water in the tank. As shown in FIG. 15, a downwardly extending channel 232 coextensive with the outer dimensions of outlet opening 224, extends downwardly from water compartment 200 through water outlet opening 182 in housing 126, and prevents water from passing into the housing at the bottom of the water compartment. Inwardly extending flanges 234 are formed on the lower end of each side of downwardly extending channel 232, and perforated splash plate 228 rests on these flanges and breaks the fall of the water as it passes downwardly into the tank. FIG.

15 depicts perforated splash plate 228 mounted on flanges 234 for deflection of water passing downwardly into the tank.

Water entering into the water compartment through inlet 208 is filtered by means of an open filter tray 236 that rests in the filter section 204 of the water compartment. Filter tray 236 is an L-shaped tray having a perforated bottom 238 and raised interconnected side walls. Filter tray comprises solid front and back walls 240 and 242 respectively, and a solid left hand end wall 244 (FIG. 11 orientation). All of the solid side walls are flush with corresponding side walls of filter compartment 204 of the water compartment.

Figure 17:
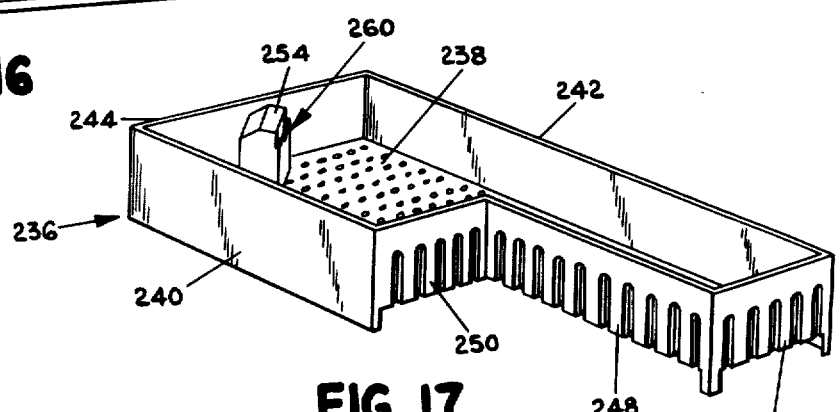
FIG. 17 is a perspective view of the removable filter tray of the second embodiment of the present invention.
Figure 18:
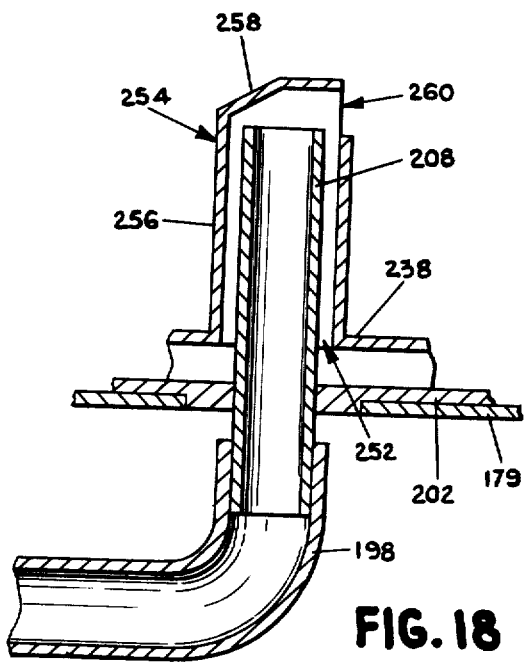
FIG. 18 is a cross-sectional view of the inlet to the filter tray of the second embodiment of the present invention.
Figure 19:
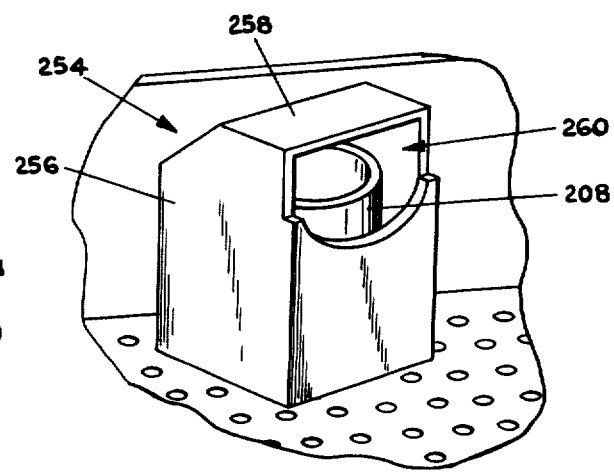
FIG. 19 is a perspective view of the inlet of the filter tray of the second embodiment of the present invention.

Filter tray 236 also comprises a vertically slotted right hand end wall 246, which is spaced slightly away from right hand end wall 216 of the filter section of the water compartment. The filter tray also comprises vertically slotted interior walls 248 and 250 which are formed at right angles to one another and face the open end of the heater section of the water compartment. As shown in FIG. 17, side walls 240, 242, 244, and 246 all extend downwardly below the bottom of the filter tray and rest on the bottom of the water compartment when the filter tray is in place. This causes perforated bottom 238 of the filter tray to be raised somewhat above the bottom of the water compartment, thus providing a water passageway from the space underneath the water tray to the heater section and water outlet of the water compartment.

Similarly, slotted walls 246, 248 and 250 are spaced apart from the side walls of the water compartment, thereby providing open water flow passage through these walls.

The filter tray is provided with an inlet opening 252 that mates with, but is somewhat larger than, inlet 208 in the water compartment. Preferably opening 252 is rectangular in nature. A rectangular water deflection hood 254 is mounted over inlet 252 and extends upwardly over the top of inlet 208 of the water compartment. The water deflection hood comprises rectangular tubular side walls 256 extending upwardly from the bottom of the tray, and a partially beveled water deflection cap 258 mounted on the top of the side walls. An opening 260 at the top of the hood faces at an angle into the interior of the filter tray adjacent the upper end of inlet tube 208, and deflection cap 258 is angled so that water entering upwardly through inlet 208 is deflected by the deflection cap out of opening 260 into the interior of the filter tray. Opening 260 is formed at a point above the top of the slots in the side walls of the filter tray, but at a point below the upper edge of the side walls themselves of the filter tray.

As shown in FIG. 17, it is preferred that the water inlet be positioned somewhat toward the corner of the filter tray, with the inlet hood skewed toward the center of the tray. This provides a favorable flow pattern in the filter tray and enhances the effectiveness of the filter.

An important advantage achieved by the inlet and hooded water deflector feature of the present invention is that the hooded water deflector acts as an automatic water overflow once the water level in the filter tray reaches a predetermined level. After the water reaches a point above the slots in the side of the tray but before the water flows over the top of the filter tray, the water reaches the bottom of opening 260 in deflection hood 254 and passes between side walls 256 and inlet tube 208 downwardly into water compartment 200, without being subjected to filtration in the filter tray. This prevents water overflow into the interior of the housing and is an important safety feature of the system.

In order to accomplish its desired filtering action, filter tray 236 is filled to a level below opening 260 with a suitable filter medium such as granulated charcoal or the like.

The design of the removable filter tray is an important feature of the present invention, because this filter tray presents a large surface area for water filtration and provides numerous outlets and a desirable flow pattern for water to pass from the filter tray to the heater section of the water compartment. Since it is an important feature in the present invention that the filter apparatus be capable of filtering water at a rate of at least 150 gallons per hour and preferably at a rate of 180–210 gallons per hour, the special design features of the water compartment discussed herein are important in order to permit a sufficient rate of flow through the filter tray, without necessitating a force filtration process, which tends to result in a turbulent water flow and inefficient filtering action by the filter. With the filter tray constructed in accordance with the present invention, efficient water filtration is achieved without force filtration at filtration rates desired in the present invention.

When the water compartment and removable filter tray are inserted in the housing, filter tray 236 is enclosed by a top 237 having a recessed handle 239 and water compartment 200 is enclosed by a top 201. These tops keep water from passing out of the filter tray into the water compartment without being filtered and prevent water from passing out of the water compartment into the dry sections of the housing.

A horizontally disposed elongated heater 262 is mounted in the closed end of heater section 206 and extends inwardly therefrom adjacent partition 226. Heater 262 extends past open end 222 of the heater section and terminates adjacent slotted walls 248 and 250 of the removable filter tray. Heater 262 is a conventional device comprising a heater element enclosed in a glass tube, and may be the same type employed in the Embodiment I configuration of the present invention. Heater 262 has a manually adjustable thermostatic control unit 264 on the end thereof that extends outwardly from the heater section. A lead 266 extends from the heater to the electrical control apparatus of the present invention.

Figure 22:
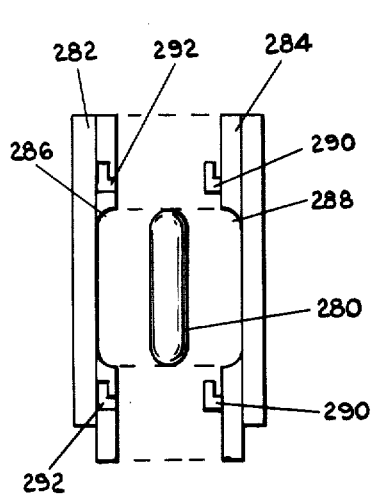
FIG. 22 is an exploded side view of an alternative heater mounting assembly for the second embodiment of the present invention.
Figure 23:
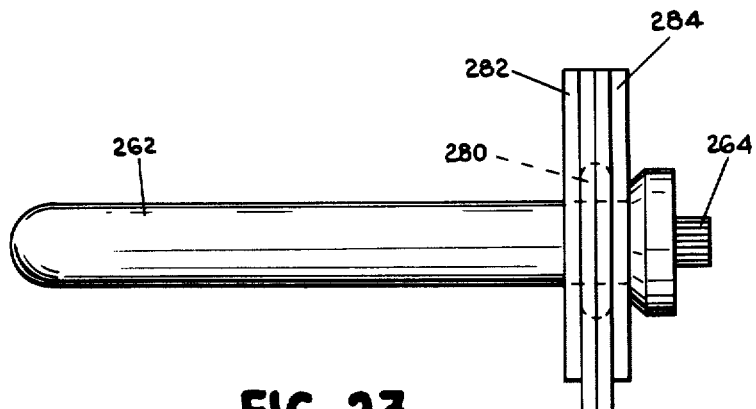
FIG. 23 is a side view showing the heater mounted in the heater mounting assembly of FIG. 22.
Figure 24:
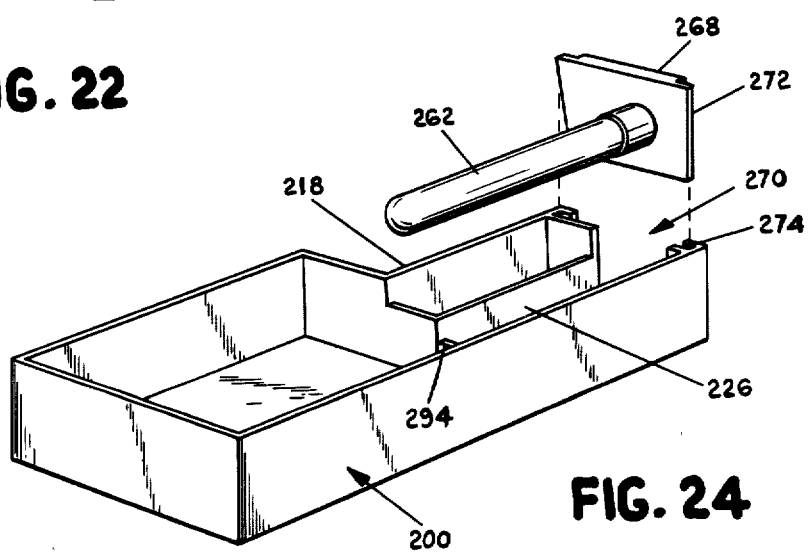
FIG. 24 is a perspective view of the water compartment of the second embodiment of the present invention, showing the water heater and heater mounting assembly withdrawn from the water compartment.

The particular manner in which the heater is mounted in the heater section of the present invention is shown in detail in FIGS. 20–24. As shown in FIG. 24, the heater is mounted in a tapered mounting bracket or insert 268 that fits downwardly and clips into an open section 270 in end wall 220 of the heater section. Insert 268 has a ridge 272 extending outwardly therefrom around the outer edge thereof, and this ridge fits into a corresponding groove 274 formed in the outer edge of open section 270. Preferably, insert 268 is tapered inwardly from the top to the bottom thereof, and open section 270 is formed in a corresponding manner, so that a watertight wedge fit may be accomplished between the insert and the open section. This insures a watertight fit between the insert and the open section.

The reason why it is desirable to mount the heater element in a removable insert is that when the water compartment and heater are mounted in the housing of the aquarium, it is difficult or impossible to remove the heater element from the water compartment without removing the entire water compartment from the aquarium. By mounting the heater in a removable insert, the heater can be removed and replaced without disturbing the filter tray and water compartment. When the water compartment is not a separate unit but is integrally formed in the housing (as in Embodiment I) the provision of the removable insert is essential to the servicing of the heater element in the module.

Figure 20:
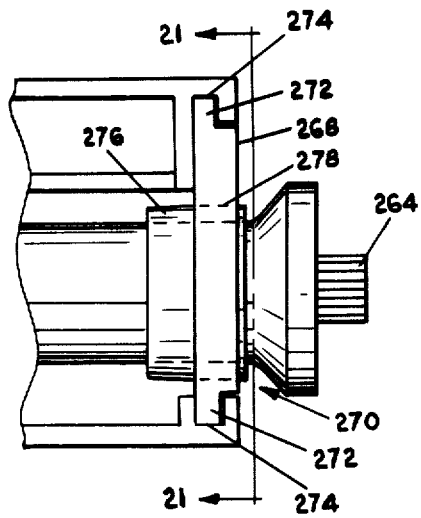
FIG. 20 is a top view of the heater mounting of the second embodiment of the present invention.
Figure 21:
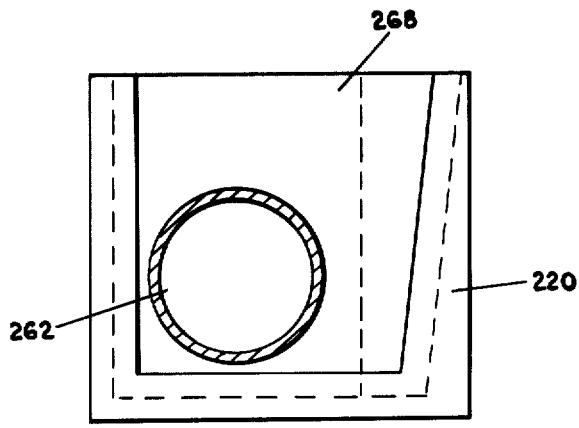
FIG. 21 is a sectional view taken along line 21—21 of FIG. 20.

Two different types of removable inserts are shown in FIGS. 20–23. In FIGS. 20 and 21, the watertight heater mounting is provided by a thin plastic sleeve 276 that extends through a central opening 278 in insert 268. This sleeve is tapered inwardly on the sides thereof facing the interior of the heater section of the water compartment, so that the heater will fit snugly and resiliently in the sleeve in a watertight manner. This type of mounting assembly is commonly referred to as a "bayonet" fit.

The bayonet fit shown in FIGS. 20 and 21 is a satisfactory mounting means as long as it is possible to secure heater elements having a reasonably uniform and consistent cross-sectional area. However, if there is some variance in the diameters of these heater elements, there may not be enough resiliency in the sleeve to accommodate a wide variety of sizes of heater elements, so it may not be possible to achieve a watertight fit in every case. In a situation such as this, it is necessary to use a mounting mechanism for the heater that provides more tolerance for variations in the size of the heater element. Such a mounting mechanism is shown in FIGS. 22 and 23, wherein a flexible O-ring seal 280 is compressed between an inner compression plate 282 and an outer compression plate 284, which lock together by means of interlocking tabs 290 and slots 292. The plates have mating openings formed therein, and annular recesses 286 and 288 mate when the plates are placed together and provide a housing for O-ring 280.

With the insert formed in this manner and the O-ring seal firmly clamped between the compression plates, the heater element can be inserted through the center of the O-ring seal in the manner shown in FIG. 23, and a secure watertight fit will be secured, even though there may be some variations in the diameters of the various heater elements that may be installed in the units.

When the insert 268 is fitted into open section 270 of the water compartment, the inward end of heater 262 is supported in a generally horizontal position by means of a curved, upwardly extending flange 294 adjacent the open end of the heater section. With the heater element in place, the heater element is positioned below the top of partition 226, thus insuring that the heateer element will be completely covered with water when the filtering and heating mechanism is in operation. With the heater element in this position (i.e., below the level of the partition and immediately adjacent the partition), water passing out of the filter tray must pass in close proximity to the heater before it can spill over the partition and downwardly back into the tank. Water flowing into heating section 206 is thus necessarily heated by heater 262 before it passes back into the tank. The natural tendency of heated water to rise to the surface and cooler water to settle to the bottom of a container further enhances the heating function of the apparatus and causes a circulation pattern whereby cooler water flows along the bottom of the heating compartment and is warmed by the heater and the water surrounding the heater. The water then rises to the top of the heater compartment and spills over the top of the partition and falls downwardly back into the tank. When the warm water strikes the surface of the water in the tank, it immediately spreads out and down the entire surface and slowly settles downwardly in the tank, thus creating natural thermal layers in the water, which are similar to a fish's natural environment.

The heater of the present invention provides adequate water heating capacity to maintain any desirable fish maintenance temperature in the tank, even when the water is being circulated through the filter and heating apparatus at a rate of 180 gallons per hour or more.

In addition to the filter, heating, and aerating elements in the module, the module also includes a compartment for mounting an automatic fish feeder 296. The fish feeder described above in connection with Embodiment I of the present invention is suitable for use in this embodiment as well.

The operation of the module of the present invention is accomplished by conventional electrical circuitry (not shown) and is accuated by three separate switches 300, 302, and 304. Switch 300 operates the motor and heater as a unit. The reason for operating the motor and heater as a unit is to assure that the heater is turned off whenever the motor is disconnected, thereby preventing overheating of the water and possible damage to the heating unit. Switch 302 is a conventional switch operating the light, and switch 304 is a conventional switch operating the feeder.

Figure 25:
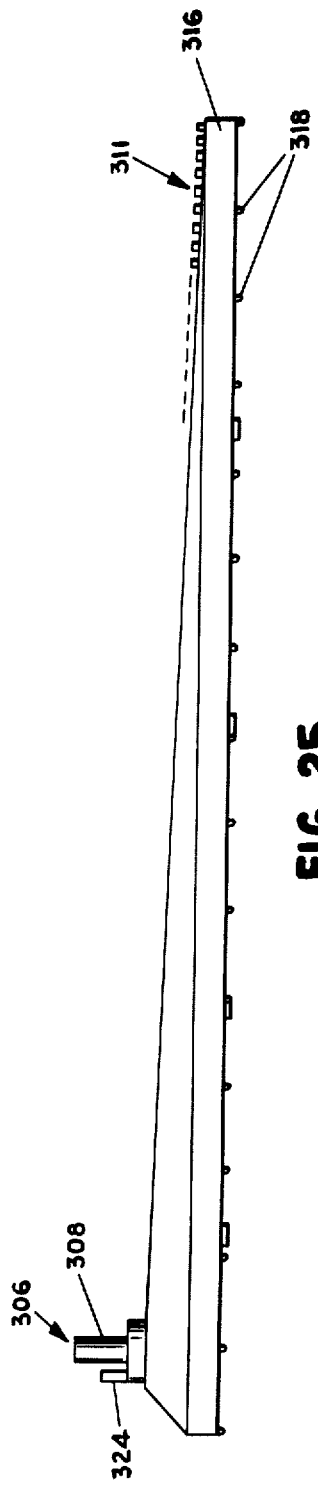
FIG. 25 is a side view of the undergravel filter of the present invention.
Figure 26:
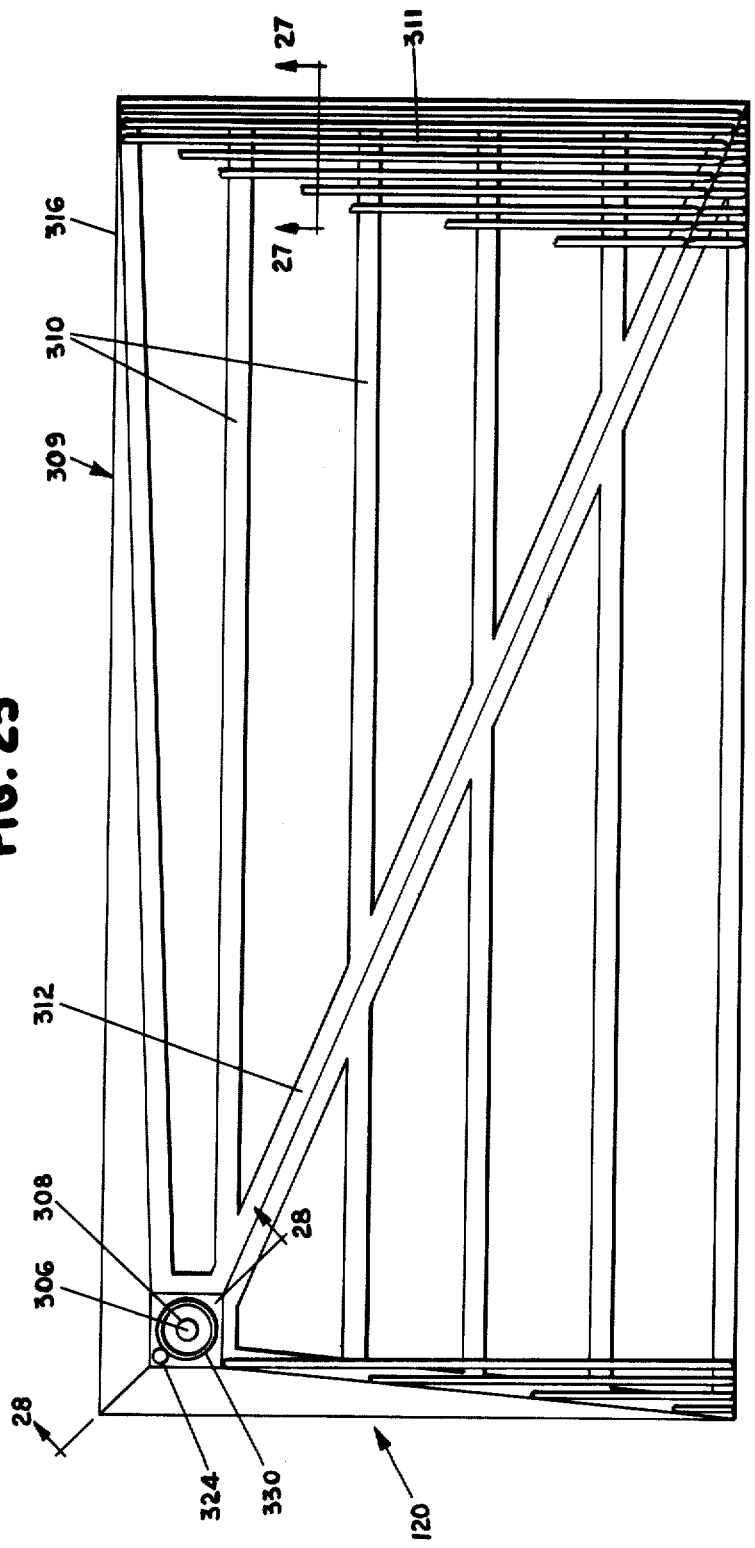
FIG. 26 is a top view of the undergravel filter of the present invention.

The details of construction of the undergravel filter 120 of the present invention are shown in FIGS. 25–31. As shown in FIG. 26, undergravel filter 120 is rectangular in shape and comprises an outlet opening 306 at the upper left hand corner thereof (FIG. 26 orientation). Outlet 306 is formed by a raised tubular section 308 extending upwardly from the top of the undergravel filter.

The undergravel filter comprises a support frame 309 consisting of a series of parallel longitudinal support members 310 that run the longitudinal length of the undergravel filter and a diagonal support member 312 that runs from the outlet of the undergravel filter to the opposite corner of the undergravel filter. A meshed grating 311 in the form of closely spaced raised ridge members 312 running transversely to longitudinal support members 310 is mounted on top of the support members. The spaces between transverse ridges 312 are sufficient for the passage of water therethrough but are to small for the passage of gravel. The gravel is not shown in these drawings, but it would be piled on top of the top surfaces 314 of ridges 312 and water passes downwardly through the gravel and through the openings between the ridges and into the open space between the undergravel filter and the bottom of the filter.

As shown in FIG. 25, the top of the undergravel filter slopes upwardly from the right hand and bottom edges thereof (FIG. 26 orientation) to undergravel filter outlet 306. This upward slope increases the volume of the area below the outlet of the undergravel filter and enhances the water flow characteristics underneath the undergravel filter.

The outer perimeter of undergravel filter 120 comprises a downwardly extending skirt 316. This skirt rests on short projections or legs 318, which raise the bottom of the undergravel filter slightly off of the bottom of the tank. This further enhances the water flow characteristics of the undergravel filter.

The structure of the upper portion of the undergravel filter 120 provides an important advantage over previous undergravel filters. In most filters, the upper surface of the undergravel filter comprises a slotted surface interrupted periodically by transverse support members cutting across the slots. In the areas immediately above the transverse support members, no slots are provided, so that the gravel resting on such support members is in effect isolated from the downward water flow passing through the undergravel filter. The areas of restricted flow are called "dead" spots, and toxic conditions develop in these dead spots and impair the development of a suitable biological environment in the filter medium.

In the apparatus of the present invention, this problem is obviated by mounting the transverse ribs on top of and extending upwardly from longitudinal support members 310. Thus, as shown in FIG. 27, there is an open space between the upper surfaces 314 of ridges 312 and the support members 310 that run underneath the ridges. Therefore, water is permitted to pass downwardly through all areas of the gravel in the filter, even the gravel immediately above support members 310. This feature eliminates the dead spots in the undergravel filter and enhances the development of the biological environment in the filter medium.

The water outlet 306 of the undergravel filter is shown in detail in FIGS. 28 and 29. This outlet is suitable for use either in connection with the positive pumping action employed in the preferred practice of the present invention or in connection with a conventional air recirculation system. This feature makes the undergravel filter of the present invention useful in either the present development or in previously existing systems.

When used in the content of the present invention, outlet tube 308 is connected to plastic tube 122 which in turn leads to the inlet of the pump (as shown in FIG. 28). The pump withdraws water from tube 308 from the space beneath the undergravel filter by a positive pumping action. A smaller inlet 324 is covered by a removable cap 325 during this operation.

When the undergravel filter is to be employed in connection with the air recirculation system, a conventional air pump is connected by means of a tube 322 to a smaller inlet tube 324 that extends downwardly into the space beneath the undergravel filter immediately adjacent to outlet tube 308. The air pumped downwardly through inlet tube 324 enters the space 326 immediately below outlet tube 308. This air, under the force of gravity, then passes upwardly through outlet tube 308 and back into the tank. The upward action of the air in tube 308 causes a partial vaccuum in cavity 326 and this partial vaccuum causes the water under the undergravel filter to flow upwardly through outlet 308 along with the air. This causes a recirculation of water downwardly through the tank and the undergravel filter and then upwardly through the outlet tube 308 and back into the tank.

In order to enhance the vaccuum action of the air recirculation system and to increase the aeration effects achieved by bubbling the water through the water, in the present invention a larger hollow tube 328 is inserted in a collar 330 surrounding outlet tube 308. This large concentric tube extends upwardly into the water tank a distance of about 6 inches and forms an upward channel for the rising air and water. This controlled flow pattern further enhances both the aeration and recirculation effects of the air.

In order to further disperse the air in larger tube 328, a conical air dispersion device 331 is inserted downwardly into the top of tube 308. This device is spaced apart from the walls of tube 308 by a series of projections 332 and is provided with a plurality of slots therein, so that the air is thoroughly dispersed and distributed throughout the cross-sectional area of tube 328 as it passes through the outlet of tube 308. The finely dispersed air bubbles are more easily absorbed into the water and provide greater aeration of the water than large bubbles.

When the undergravel filter of the present invention is employed in a tank larger than a conventional 20 gallon tank (i.e., a 30 gallon tank 113 as shown in FIG. 10) extension sections 156 are connected to each end of the undergravel filter in order to extend the undergravel filter to the full length of the tank. Each extension section 156 comprises a rectangular frame 334, with cross members 336 extending across the longer edges of the frame. Ridges 337 of the same type employed in the main section of the undergravel filter are mounted in closely spaced parallel relationship on frame 334 and extend the same direction as the ridges extend in the main section of the undergravel filter. The extensions sections 156 are attached to the ends of the main section of the undergravel filter by means of clips 338 that engage corresponding slots 339 in the ends of the undergravel filter. The sides of frame 334 comprise a downwardly extending skirt 340, which has projections or legs 342 on the bottom thereof that hold the extension section slightly above the bottom of the tank, thereby improving the water circulation underneath the extension section in the same manner as legs 318 operate in the main section of the undergravel filter.

One of the principal advantages of the present invention is that water is circulated through the filter medium at a sufficient rate of speed to permit the development of a natural biological filtration environment in the filter medium. In most cases, the water in the tank should be recirculated through the filter medium at least about seven and one-half times per hour to achieve this result and preferably the water should be recirculated through the filter medium at least nine times per hour. With a conventional 20 gallon tank and an undergravel filter of the type described, the water should be recirculated through the tank at a rate of at least 150 gallons per hour and preferably at least 180–210 gallons per hour. At these recirculation rates, a satisfactory biological environment develops in a new filter medium in a period of about two months of use with fish in the aquarium, and this biological filtration both increases the effectiveness of the filtration process and prolongs the length of time between filter cleanings. A biological filtration environment probably would develop with a recirculation rate of five times per hour (100 gallons per hour for a 20 gallon tank and 150 gallons per hour for a 30 gallon tank), but it would take a substantially longer time for this to occur at this rate of speed.

Another important advantage of the present invention is that water aeration is provided naturally by the waterfall action produced at the elongated outlet of the water compartment. The water is thoroughly dispersed by the elongated partition and falls a substantial distance from the top of the partition to the surface of the water in the tank, and during this time the water absorbs sufficient oxygen from the air to replenish the oxygen supply in the water in the tank. The fact that the water is recirculated rapidly through the system markedly enhances the effectiveness of this natural aeration system.

It should be understood that the embodiments described herein are merely exemplary of the preferred practice of the present invention and that various changes, modifications, and variations may be made in the arrangements, operations, and details of construction of the elements disclosed herein without departing from the spirit and scope of the present invention.

The embodiments of the invention in which an exclusive property of privilege is claimed are defined as follows:

1. An aquarium module for filtering, heating, and aerating water in an aquarium including a water tank having a bottom and an open top, said module comprising:

a housing mounted on the top of the water tank, said housing having a top and a bottom and an open interior positioned over the water tank, with the open interior comprising a pump compartment and a water compartment, the water compartment having an open interior formed by a bottom and raised side walls extending around the periphery of the water compartment, said water compartment further comprising inlet means for receiving water and outlet means for delivering water back to the tank, said outlet means comprising an elongated opening in the bottom of the water compartment that leads downwardly to the tank;

mechanical pump means mounted in the pump compartment and having an inlet in communication with the water in the tank and an outlet in communication with the inlet means of the water compartment, said pump means being adapted to mechanically pump water from the tank, circulate the water through the water compartment, and return the water back to the tank at a sufficient rate of speed to permit the development of a biological filtration environment in filter means mounted in the water compartment;

high capacity gravity filter means comprising a removable filter tray resting in the water compartment, said filter tray having a raised perforated bottom and raised side walls, said filter tray having an open top fitted with a removable cover and having an open interior that is adapted to be at least partially filled with a filter medium means for removing impurities from the water, said filter tray having inlet means for receiving unclarified water at the top of said filter medium from the pump means outlet and outlet means at a lower portion thereof for delivering clarified water to the interior of the water compartment, said inlet and outlet means being positioned such that the water flows downwardly through the filter medium means under the influence of gravity as it passes from the inlet means to the outlet means;

water heater means mounted beside the filter means in the interior of the water compartment, said water heater means positioned adjacent the water compartment outlet means such that water passing from the filter means outlet means must first pass in proximity to the heater means before it can return to the tank through the water compartment outlet means; and natural aeration means mounted in the water compartment and comprising a raised partition means mounted along the edge of the water compartment outlet means and separating the water compartment outlet means from the rest of the interior of the water compartment, said partition means extending upwardly to a position above the height of the water heater means in the water compartment and being adapted to disperse clarified and heated water in the water compartment into a thin sheet and direct it downwardly in waterfall fashion through the water compartment outlet means back to the tank, said natural aeration means being adapted to aerate the water as it falls downwardly into the tank.

2. An aquarium module as claimed in claim 1 wherein the filter means comprised overflow outlet means for relieving water pressure on the filter means, said overflow outlet means acting to relieve pressure on the filter means by conveying excess water introduced into the filter inlet means around the filter means to the heater means in the water compartment, said overflow outlet means causing water to bypass only the filter means so that it still is subjected to heating and aerating in the module before being returned to the tank.

3. An aquarium module as claimed in claim 2 wherein the filter tray substantially fills the water compartment except for the space occupied by the heater means, and the filter tray includes at least one slotted side wall spaced apart from the side walls of the water compartment.

4. An aquarium module as claimed in claim 1 wherein the water compartment is removable from the interior of the housing, the housing comprising an inlet in communication with the water compartment inlet, and an elongated outlet mating with the water compartment outlet.

5. An aquarium module as claimed in claim 2 wherein:

the water compartment inlet means comprises an opening in the bottom of the water compartment, with a hollow inlet tube being mounted in said opening and extending upwardly above the level of the filter medium in the filter tray but below the height of the filter tray side walls;

the filter inlet means comprises a filter inlet opening in the bottom of the filter tray, said opening being larger than the outer diameter of the hollow tube, and being positioned so that it fits over the hollow tube when the filter tray is in place, said inlet means further comprising a deflection hood mounted over said filter inlet opening and over and spaced apart from said walls that extend upwardly above the top of the hollow tube, said tubular side walls being spaced apart from the hollow tube and having an opening therein adjacent the top of the hollow tube, said deflection hood further having a deflection cap means on the top thereof to deflect water received from the hollow inlet tube into the filter tray through the opening in the side walls of the deflection hood, the space between the deflection hood and the inlet tube serving as the overflow outlet means; and the outlet means of the pump means is connected to the bottom of the hollow tube in the water compartment.

6. An aquarium module as claimed in claim 5 wherein:

the water compartment is removable from the housing;

the upright hollow tube mounted in the bottom of the water compartment also extends downwardly therefrom through an opening in the housing into the interior of the tank; and the outlet of the water compartment comprises a channel-shaped projection surrounding the outlet opening on the bottom of the water compartment and extending downwardly therefrom through an opening in the housing and into the interior of the tank.

7. An aquarium module as claimed in claim 1 wherein the heater means comprises a heater element and said heater element is mounted in a removable insert in an open section in one of the side walls of the water compartment.

8. An aquarium module as claimed in claim 7 wherein:

the open section of the water compartment side wall is tapered inwardly from the top to the bottom thereof annd comprises an edge thereof that receives the insert, said edge having a groove therein;

the insert is tapered inwardly from the top to the bottom thereof and comprises an outer edge having a ridge thereon that fits snugly in the groove in the edge of the open section, thereby providing a watertight fit between the insert and the open section.

9. An improvement as claimed in claim 8 wherein the insert comprises:

a front plate facing the interior of the water compartment and having an opening therein for the water heater and an annular recess around said opening on an outer side of the front plate facing away from said water compartment;

a back plate adjacent the outer side of the front plate and having an opening therein for the water heater that mates with the opening in the front plate, said back plate having an annular recess around the opening coextensive with and facing the annular recess in the front plate;

an O-ring seal means positioned in the annular recesses between the plates, said O-ring seal means being adapted to sealingly engage the water heater when it is extended through the opening;

releasable locking means adapted to hold the front and back plates together, pinching the O-ring seal means therebetween; and ridges on the outer edge of the front and back plates, said ridges being formed so that when the plates are fastened together the two ridges form a single ridge that snugly fits into the groove in the open section of the closed end of said second section.

10. An aquarium module as claimed in claim 1 and further including a splash plate means removably mounted between the top of the partition means and the water in the tank, said splash plate means being adapted to break the fall of the water as it falls downwardly into the tank from the top of the partition means.

11. An aquarium module as claimed in claim 10 wherein the splash plate comprises a flat perforated plate and is removably mounted below the water compartment outlet means by means of a pair of L-shaped mounting brackets extending downwardly from the housing on opposite sides of the water compartment outlet means, said mounting brackets including horizontally disposed, inwardly extending flanges that engage and support opposite sides of the splash plate.

12. An aquarium as claimed in claim 1 wherein the open interior of the housing also includes an automatic fish feeder and a fish light housed in separate feeder and light compartments in the housing, the feeder compartment having a food opening means for dispensing food into the tank from the fish feeder, and the light compartment having a transparent viewing plate means for transmitting lumination from the light to the interior of the tank.

13. Apparatus for filtering, heating, and aerating water in an aquarium including a water tank having a bottom and an open top, said apparatus comprising:

undergravel filter means mounted on the bottom of the aquarium and comprising inlet means in the form of a raised grating adapted to be covered with gravel and outlet means for withdrawing water from the space between the raised grating and the bottom of the tank, the withdrawal of water through said outlet means causing water to flow downwardly through the gravel and raised grating into the space below the raised grating;

a housing mounted on the top of the water tank, said housing having a top and a bottom and an open interior positioned over the water tank, with the open interior comprising horizontally spaced pump and water compartments, the water compartment having an open interior formed by a bottom and raised side walls extending around the periphery of the water compartment, said water compartment further comprising inlet means for receiving water and outlet means for delivering water back to the tank, said outlet means comprising an elongated opening in the bottom of the water compartment that leads downwardly to the tank;

mechanical pump means mounted in the pump compartment and having an inlet in communication with the outlet of the undergravel filter means and an outlet in communication with the inlet means of the water compartment, said pump means being adapted to mechanically pump water from the outlet of the undergravel filter, circulate the water through the water compartment and then return the water back to the tank at a sufficient rate of speed to permit the development of a biological filtration environment in the gravel of the undergravel filter;

high capacity gravity filter means removably mounted in the water compartment, said filter means comprising a container having an open interior that is adapted to be at least partially filled with a filter medium means for removing impurities from the water, said container having inlet means at an upper portion for receiving unclarified water from the pump means outlet and outlet means at a lower portion thereof for delivering clarified water to the interior of the water compartment, said inlet and outlet means being positioned such that the water flows downwardly through the filter medium under the influence of gravity as it passes from the inlet means to the outlet means, said filter means being adapted to clarify the water sufficiently at said sufficient rate of water recirculation provided by the pump means;

water heater means mounted in the interior of the water compartment adjacent the water compartment outlet means, said water heater means being positioned such that water passing from the filter means outlet means must first pass in proximity to the heater means before it can return to the tank through the water compartment outlet means, said heater means being adapted to heat the water satisfactorily at said sufficient rate of water recirculation provided by the pump means; and natural aeration means mounted in the water compartment and comprising a raised partition means mounted adjacent the edge of the water compartment outlet means and separating the water compartment outlet means from the rest of the interior of the water compartment, said partition means extending upwardly to a position above the height of the water heater means in the water compartment and being adapted to disperse clarified and heated water in the water compartment into a thin sheet and direct it downwardly in waterfall fashion through the water compartment outlet means back to the tank, said natural aeration means being adapted to aerate the water sufficiently at said sufficient rate of speed provided by the pump means.

14. Apparatus as claimed in claim 13 wherein the pump means is adapted to circulate the water in the tank through the module at a rate at least 100 gallons per hour and the filter, heater, and aeration means are capable of filtering, heating, and aerating the water satisfactorily at that rate of speed.

15. Apparatus as claimed in claim 13 wherein the pump means is adapted to circulate the water in the tank through the module at a rate of at least 150 gallons per hour and the filter, heater, and aeration means are capable of filtering, heating, and aerating the water satisfactorily at that rate of speed.

16. Apparatus as claimed in claim 13 wherein the pump means is adapted to circulate the water in the tank through the module at a rate of at least 180 gallons per hour and the filter, heater, and aeration means are capable of filtering, heating, and aerating the water satisfactorily at that rate of speed.

17. Apparatus as claimed in claim 13 wherein:
the grating is mounted on a support frame that rests on the bottom of the water tank, said support frame comprising of at least one support member extending transversely to the slots in the grating intermediate the sides of the grating at each end of the slots; and said grating comprises a plurality of parallel, closely spaced raised ribs mounted on top of the support member with the ribs extending upwardly from the support member, said ribs being spaced sufficiently closely such that the gravel remains substantially on top of the ribs, whereby, full circulation through the undergravel filter is achieved and dead spots of no circulation above the support member are eliminated.

18. Apparatus as claimed in claim 17 wherein the outlet of the undergravel filter is in a corner of the undergravel filter, and the undergravel filter is sloped upwardly to the outlet from the edges opposite the outlet.

19. Apparatus as claimed in claim 13 wherein the outlet of the undergravel filter comprises:
an outlet opening in the top of the undergravel filter;
an outlet tube extending upwardly from the outlet opening to an open upper end in the interior of the water tank;
a collar extending around the top of the outlet opening and concentric with the outlet tube;
a larger tube coaxial with and having a cross-sectional area larger than the outlet tube mounted in the collar and extending upwardly beyond the upper end of the outlet tube to an open top in the interior of the tank; and
an air pump inlet in the undergravel filter adjacent the outlet opening.

20. Apparatus as claimed in claim 19 and further comprising a conical air dispersion means that fits in the upper end of the outlet tube, said air dispersion means being adapted to cause air to be dispersed in fine bubbles across the entire cross sectional area of the larger tube.

21. An aquarium module for filtering, heating, and aerating water in an aquarium including a water tank having a bottom and an open top, said module comprising:
a housing mounted on the top of the water tank, said housing having a top and a bottom and an open interior positioned over the water tank, with the open interior comprising horizontally spaced pump and water compartments, said open interior also including a fish feeder compartment and a light compartment having a light transmitting plate in the bottom thereof;
the water compartment comprises an open interior formed by a bottom and raised side walls extending around the periphery of the water compartment, said water compartment further comprising inlet means for receiving water and outlet means for delivering water back to the tank, said outlet means comprising an elongated outlet opening in the bottom of the water compartment that leads downwardly to the tank, said water compartment comprising a relatively wide filter section and a relatively narrow heater section, with the water compartment inlet means comprising a vertical inlet tube extending upwardly in one end of the filter section and the heater section opening into and extending outwardly from the other end of the filter section, the heater section comprising elongated parallel front and back side walls, an open end opening into the filter section, and a closed end extending away from the filter section, the elongated water compartment outlet opening being formed along one of the side walls of said heater section;
mechanical pump means mounted in the pump compartment and having an inlet in communication with the water in the tank and an outlet in communication with the inlet means of the water compartment, said pump means being adapted to draw water from the tank, circulate the water through the water compartment, and return the water back to the tank;
water heater means mounted in the heater compartment and comprising an elongated tubular heater element with a thermostatic control at an outer end thereof, with the heater element being mounted in a horizontal position in a removable insert in the closed end of the heater section and extending inwardly therefrom parallel to the side walls of the heater section, the thermostatic controls being positioned outside the heater section with the heater element extending through the open end of the heater section and protruding into the filter section;

filter means mounted in the filter section of the water compartment, said filter means comprising a filter tray having a raised perforated bottom and raised side walls defining an open interior and being adapted to be at least partially filled with a filter medium, said filter tray having inlet means comprising a filter inlet opening in the bottom of the filter tray, said opening being larger than the outer diameter of the water compartment inlet tube and being positioned so that it fits over said inlet tube when the filter tray is in place, said inlet means further comprising a deflection hood mounted over said filter inlet opening and over and spaced apart from said inlet tube, said deflection hood comprising raised tubular side walls that extend upwardly above the top of the inlet tube, said tubular side walls being spaced apart from the inlet tube and having an opening therein adjacent the top of the inlet tube, said deflection hood further having a deflection cap means on the top thereof to deflect water received from the inlet tube into the filter tray through the opening in the side walls of the deflection hood, the space between the deflection hood and the inlet tube serving as an overflow outlet means for relieving water pressure on the filter means by directing excess water around the filter means to the heater means;

natural aeration means mounted in the water compartment and comprising raised partition means mounted along the edge of the water compartment outlet means and separating the water compartment outlet means from the rest of the interior of the water compartment, said partition means being at least about three inches long and extending upwardly to a position above the height of the water heater means in the water compartment and being adapted to disperse clarified and heated water in the water compartment into a thin sheet and direct it downwardly in waterfall fashion through the water compartment outlet means back to the tank, said natural aeration means being adapted to aerate the water as it passes over the partition means and falls back down into the tank.

* * * * *

UNITED STATES PATENT OFFICE
CERTIFICATE OF CORRECTION

Patent No. 3,892,199  Dated July 18, 1975

Inventor(s) JEROME F. HUYLER

It is certified that error appears in the above-identified patent and that said Letters Patent are hereby corrected as shown below:

Column 3, line 29 "water" should be --waste--

Figure 2:
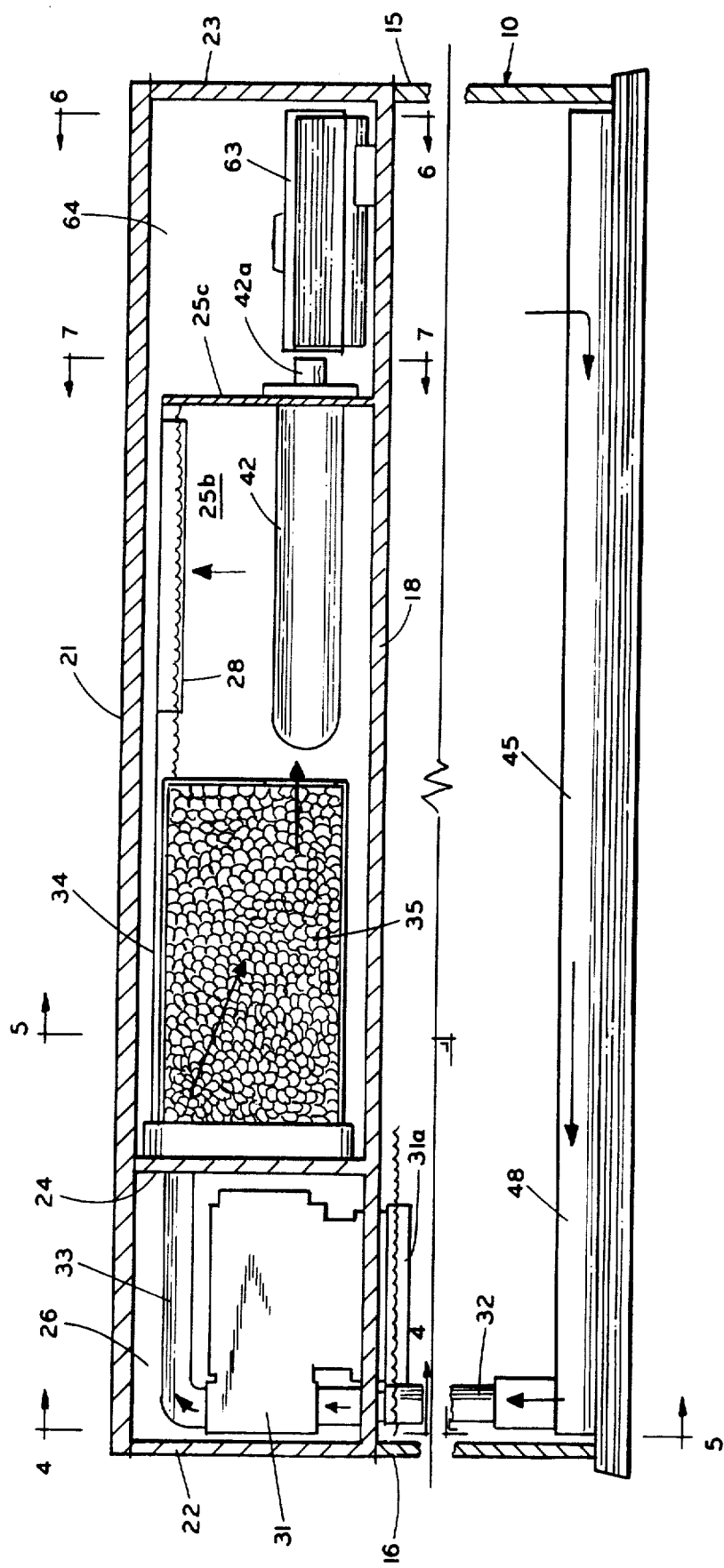
FIG. 2 is a broken front view of the first embodiment of the present invention, shown partially in section taken along line 2—2 of FIG. 3.
Figure 3:
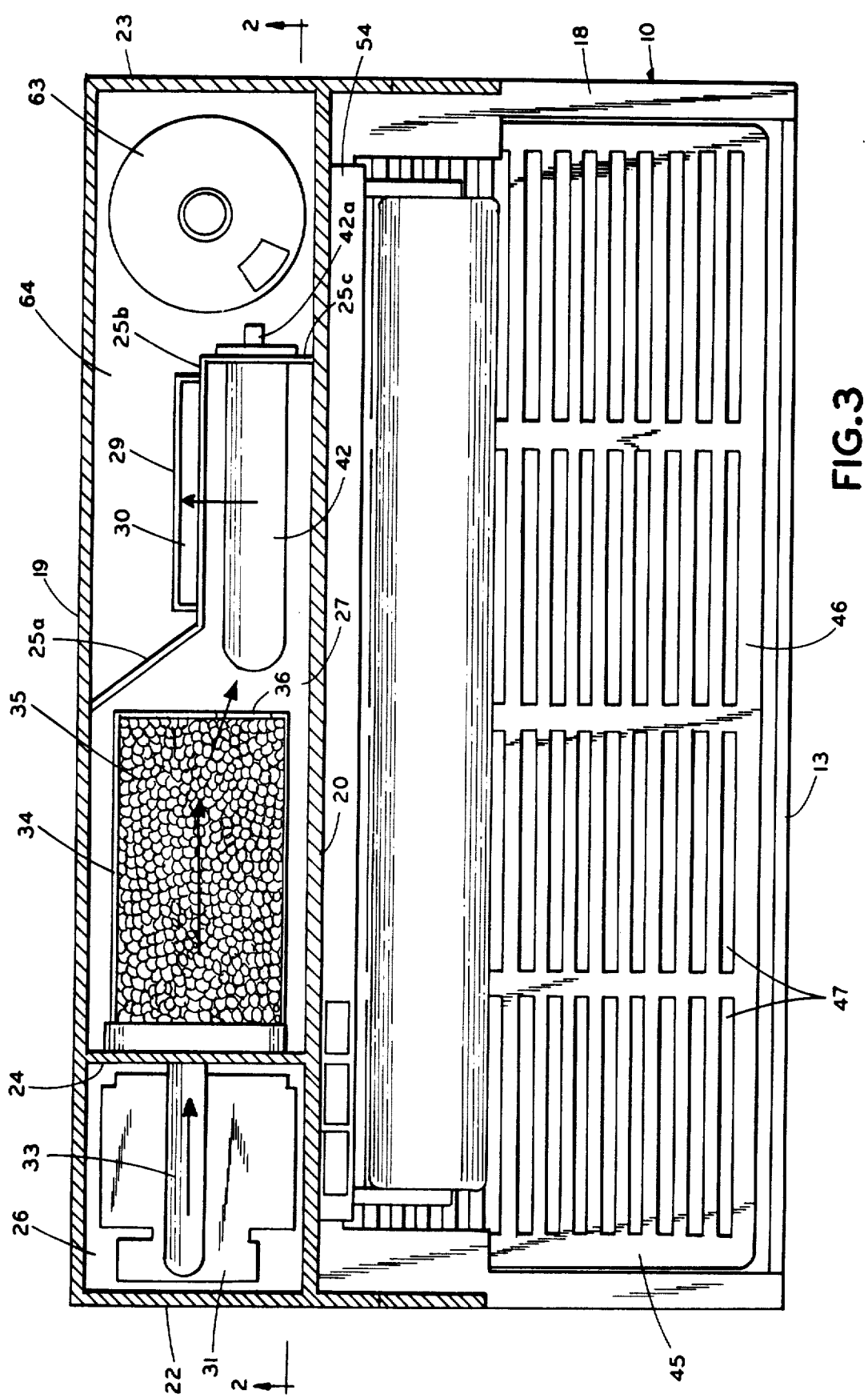
FIG. 3 is a sectional view taken along line 3—3 of FIG. 4.
Figure 4:
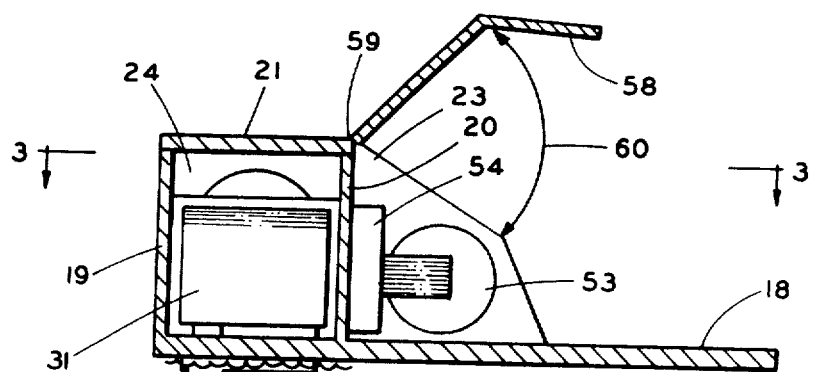
FIG. 4 is a fragmentary sectional view taken along line 4—4 of FIG. 2, with the cover of the light compartment raised.
Figure 12:
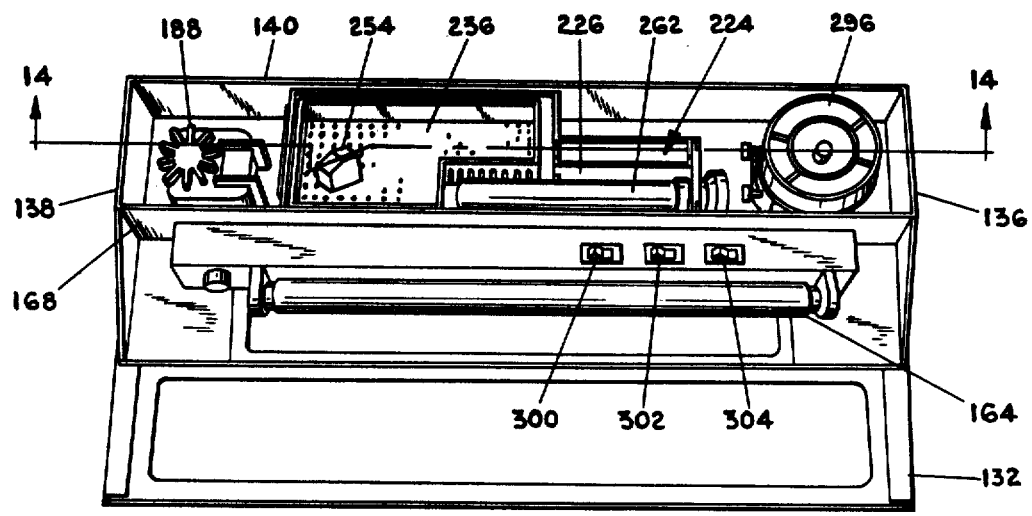
FIG. 12 is a perspective view of the module of the second embodiment of the present invention, showing the cover removed.

Column 5, line 44 "FIG. 2" should be --FIG. 12--

Claim 5, column 20, line 60 after "said" the following should be inserted --hollow tube, said deflection hood comprising raised tubular side--.

Signed and Sealed this thirtieth Day of September 1975

[SEAL]

Attest:

RUTH C. MASON
Attesting Officer

C. MARSHALL DANN
Commissioner of Patents and Trademarks